United States Patent
Elsayed et al.

(10) Patent No.: US 10,384,191 B2
(45) Date of Patent: Aug. 20, 2019

(54) STAR-SHAPE NANOPARTICLE AND A METHOD OF USING THEREOF TO DETECT ARSENIC IN A SOLUTION

(71) Applicant: King Abdulaziz University, Jeddah (SA)

(72) Inventors: Waleed Elsayed Mahmoud Elsayed, Jeddah (SA); Ahmed Abdullah Salem Al-Ghamdi, Jeddah (SA); Yusuf Abdulaziz Al-Turki, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 252 days.

(21) Appl. No.: 15/491,159

(22) Filed: Apr. 19, 2017

(65) Prior Publication Data
US 2018/0304230 A1 Oct. 25, 2018

(51) Int. Cl.
| | |
|---|---|
| C02F 1/28 | (2006.01) |
| C02F 1/30 | (2006.01) |
| C02F 1/36 | (2006.01) |
| C02F 1/38 | (2006.01) |
| B01D 15/08 | (2006.01) |
| B01D 21/26 | (2006.01) |
| B01D 21/28 | (2006.01) |
| B01J 20/04 | (2006.01) |
| B01J 20/22 | (2006.01) |
| B01J 20/28 | (2006.01) |

(Continued)

(52) U.S. Cl.
CPC ............ *B01J 20/223* (2013.01); *B01D 15/08* (2013.01); *B01D 21/262* (2013.01); *B01D 21/283* (2013.01); *B01J 20/045* (2013.01); *B01J 20/28007* (2013.01); *B01J 20/28016* (2013.01); *B01J 20/3085* (2013.01); *C02F 1/281* (2013.01); *C02F 1/285* (2013.01); *C02F 1/30* (2013.01); *C02F 1/36* (2013.01); *C02F 1/385* (2013.01); *C02F 2101/103* (2013.01)

(58) Field of Classification Search
None
See application file for complete search history.

(56) References Cited

U.S. PATENT DOCUMENTS

| | | |
|---|---|---|
| 6,197,201 B1 | 3/2001 | Misra et al. |
| 7,338,603 B1 | 3/2008 | McNew et al. |
| 9,057,705 B2 | 6/2015 | Yang et al. |

(Continued)

OTHER PUBLICATIONS

Shukla, et. al., "Synthesis and Characterization of Silver Sulfide nanoparticles Containing Sol-Gel Derived HPC-Silica Film for Ion-Selective Electrode Application.", Journal of Sol-Gel Science and Technology 23, 151-164, 2002.*

(Continued)

*Primary Examiner* — Krishnan S Menon
(74) *Attorney, Agent, or Firm* — Oblon, McClelland, Maier & Neustadt, L.L.P.

(57) ABSTRACT

A star-shape nanoparticle that adsorbs arsenic in a solution, a method of producing the star-shape nanoparticle, and a method of determining an arsenic concentration in an arsenic-containing solution via the star-shape nanoparticle and fluorescence spectroscopy are provided. Various embodiments of the star-shape nanoparticle, the method of producing thereof, and the method of using thereof to determine an arsenic concentration in a solution are also provided.

20 Claims, 15 Drawing Sheets

(51) Int. Cl.
*B01J 20/30* (2006.01)
*C02F 101/10* (2006.01)

(56) References Cited

U.S. PATENT DOCUMENTS

2006/0207945 A1   9/2006  Witham et al.
2011/0220577 A1   9/2011  Singh et al.
2012/0065614 A1   3/2012  Omary et al.

OTHER PUBLICATIONS

Hashmi et al, "Synthesis and Characterization of Silver Sulfide Nanoparticles of Various Morphologies Using Chitosan as Stabilizer", AIP Conference Proceedings 1276, 62 (2010).*
Feng et al, "Converting ultrafine silver nanoclusters to monodisperse silver sulfide nanoparticles via a reversible phase transfer protocol", Nano Research 2016, 9(4); 942-950.*
A.F.M.Y. Haider et al., "Detection of trace amount of arsenic groundwater by laser-induced breakdown spectroscopy and adsorption," Optics & Laser Technology, 2014, vol. 56, pp. 299-303.
Faten Divsar et al., "Aptamer conjugated silver nanoparticles for the colorimetric detection of arsenic ions using response surface methology," Analytical Methods, 2015, vol. 7, pp. 4568-4576.
Shrabanti Mukherjee et al., "Arsenic Detection Using Silver Nanoparticle Modified Screen Printed Electrodes," Sensor Letters, Sep. 2014, vol. 12, No. 9.
Faten Divsar et al., "Aptamer conjugated silver nanoparticles for the colorimetric detection of arsenic ions using response surface methodology," Analytical Methods, 2015, vol. 7.

\* cited by examiner

STAR-SHAPE NANOPARTICLE AND A METHOD OF USING THEREOF TO DETECT ARSENIC IN A SOLUTION

STATEMENT OF FUNDING ACKNOWLEDGEMENT

The support of DSR for funding under project no. P-006-130-436 is gratefully acknowledged.

BACKGROUND OF THE INVENTION

Technical Field

The present invention relates to a star-shape nanoparticle including silver sulfide and cesium. In addition, the present invention relates to a method of adsorbing arsenic, and a method of determining an arsenic concentration in a solution via the star-shape nanoparticle and fluorescence spectroscopy.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Arsenic is a well-known poisonous substance. The contamination of water and blood with arsenic and chemical compounds that contain arsenic has been found to be the cause of serious harmful diseases such as skin, lung, and prostate cancer. Furthermore, neurological and cardiovascular disorders, and kidney/bladder failures, were all found to be directly or indirectly linked to the presence of arsenic in living organisms. The world health organization (WHO) declared that the maximum permissible amount of arsenic in water should not exceed 10 µg/L (or 10 ppm). Therefore, an efficient method that can detect small concentrations of arsenic in water and blood is needed.

Various analytical techniques can monitor the level of arsenic in a solution, including atomic emission spectrometry, inductive coupled plasma spectrometry, electrochemical techniques, and stripping chrono-potentiometric (SCP) methods. Although these analytical techniques can detect arsenic at low resolutions of up to 1 µg/L (or 1 ppm) they may not be able to accurately measure the concentration of arsenic when interfering cations are present. In addition, these analytical techniques are costly, and require tedious sample preparation procedures and highly skilled technicians.

A variety of analytical techniques have been used in the past few years for detection, measurement, and removal of arsenic from contaminated solutions. For example, the article titled "Detection of trace amount of arsenic in groundwater by laser-induced breakdown spectroscopy (LIBS) and adsorption" [A Haider et al. Optics & Laser Technology, 2014, 56, 299-303] reports LIBS technique coupled with adsorption for the efficient detection of arsenic in liquid. Several adsorbents like bamboo slice, tea leaves, zinc oxide, and charcoal were used for detecting arsenic of up to 1 ppm in water. In addition, US published patent application no. 20110220577 relates to a process for the removal of chromium and arsenic from water by treating the contaminated water with zinc peroxide nanoparticles in a ratio ranging from 8:1 to 12:1 (mg/ml) for a period of 5-10 min, followed by filtration to obtain the desired low concentrated contamination permissible drinking water. US patent application publication no. 20060207945 discloses a method for removing arsenic from an aqueous feed by contacting said aqueous feed with solids particles that include a compound containing $Ce^{4+}$ to oxidize and remove said arsenic from said feed, thereby producing an aqueous fluid having a reduced arsenic concentration as compared to said aqueous feed. U.S. Pat. No. 6,197,201 relates to a process for stabilizing or removing arsenic and selenium from aqueous streams or slurries by lanthanum chloride. The lanthanum chloride composition can optionally contain various lanthanides selected from one or more elements including cerium, neodymium, lanthanum, promethium, praseodymium, europium, samarium, terbium, gadolinium, holmium, dysprosium, thulium, ytterbium, lutetium, and erbium. Also, U.S. Pat. No. 7,338,603 relates to a process for removing oxyanions of an element using a sorbent comprising one or more rare earth compounds to remove one or more of said oxyanions, wherein the rare earth compounds are selected from cerium, lanthanum, neodymium, praseodymium, gadolinium, europium, terbium, dysprosium, holmium, samarium, yttrium, erbium, ytterbium, thulium, scandium, and lutetium.

However, the above references have an arsenic detection limit of above 1 ppm and require narrow pH ranges, which may be problematic for detecting arsenic in blood or blood serum samples. Furthermore, the above references detected arsenic via laser-induced breakdown spectroscopy (LIBS), or a combination of LIBS and adsorption by ZnO, zinc peroxide, cerium dioxide, lanthanide chloride, yttrium carbonate, or $Eu_{0.05}Y_{0.95}PO_4$ nanoparticles.

In view of the forgoing, one objective of the present disclosure is to provide a nanoparticle to effectively adsorb and detect the presence of arsenic in a solution, with a sensitivity of up to 0.001 ppb. Another objective of the present disclosure relates to a method of determining a concentration of arsenic in a solution using the star-shape nanoparticle and fluorescence spectroscopy and/or another detection technology. The method can detect and measure arsenic in a solution, with a sensitivity of up to 0.001 ppb. Additionally, the method can be utilized to remove arsenic from a contaminated solution.

BRIEF SUMMARY OF THE INVENTION

According to a first aspect, the present disclosure relates to a star-shaped nanoparticle including, i) silver sulfide, ii) cesium, wherein the star-shaped nanoparticle has a chemical formula of $Cs_xAg_yS_z$, wherein $0.01 \leq x \leq 0.1$, $1.5 \leq y \leq 2.5$, and $z=1$.

In one embodiment, the star-shaped nanoparticle has a chemical formula of $Cs_xAg_yS_z$, wherein $0.02 \leq x \leq 0.04$, $1.9 \leq y \leq 2.0$, and $z=1$.

In one embodiment, the star-shaped nanoparticle has a chemical formula of $Cs_{0.03}Ag_{1.97}S$.

In one embodiment, the star-shaped nanoparticle has a monoclinic crystal structure.

In one embodiment, the star-shaped nanoparticle includes four conical arms each with a longitudinal axis that is substantially perpendicular to that of an adjacent arm, wherein each arm has a cone height of about 100 to 150 nm, a cone base diameter of about 40 to 60 nm, and a cone tip diameter of about 5 to 20 nm.

In one embodiment, the star-shaped nanoparticle further includes a sulfur heterocycle ligand, which is bound to the star-shaped nanoparticle via a sulfur atom.

In one embodiment, the sulfur heterocycle ligand has a structure of formula (I), a structure of formula (II), or a structure of formula (III):

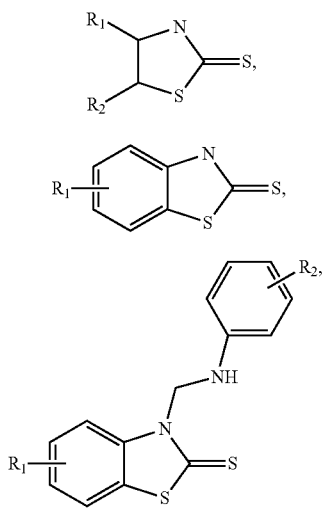

wherein R1 and R2 are independently a hydrogen, a hydroxyl, a halogen atom, a cyano, a nitro, an optionally substituted alkyl, an optionally substituted cycloalkyl, an optionally substituted cycloalkylalkyl, an optionally substituted arylalkyl, an optionally substituted heteroaryl, an optionally substituted aryl, or an optionally substituted heterocyclyl.

In one embodiment, the sulfur heterocycle ligand has a structure of formula (IV), a structure of formula (V), or a structure of formula (VI):

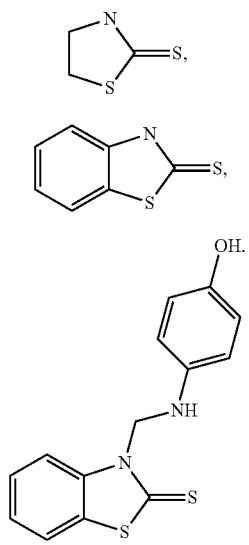

According to a second aspect, the present disclosure relates to a method of producing a star-shaped nanoparticle involving, i) mixing a silver-containing compound with a cesium-containing compound and a dihydroxy alkane to form a first solution, ii) heating the first solution to a temperature of 100 to 150° C. in an inert atmosphere, iii) mixing a sulfide compound with the first solution to form a second solution, iv) heating the second solution at a temperature of 150 to 220° C., v) centrifuging the second solution at a rotational speed of 10,000 to 15,000 rpm to form the star-shaped nanoparticle, which has a chemical formula of $Cs_xAg_yS_z$, wherein $0.01 \leq x \leq 0.1$, $1.5 \leq y \leq 2.5$, and $z=1$.

In one embodiment, the silver-containing compound comprises at least one selected from the group consisting of silver cyclohexanebutyrate, silver heptafluorobutyrate, silver lactate, silver pentafluoropropionate, silver tetrafluoroborate, and silver p-toluenesulfonate. In one embodiment, the cesium-containing compound is cesium oxalate. In one embodiment, the sulfide compound is chloromethyl trifluoromethyl sulfide. In one embodiment, the dihydroxy alkane is ethylene glycol.

In one embodiment, the method further involves treating the star-shaped nanoparticle with an aqueous solution comprising a sulfur heterocycle ligand, wherein the sulfur heterocycle ligand is bound to the star-shaped nanoparticle via a sulfur atom.

According to a third aspect, the present disclosure relates to a method of determining an arsenic concentration in an arsenic-containing solution involving, i) mixing a star-shaped nanoparticle with the arsenic-containing solution, ii) sonicating the arsenic-containing solution to form a suspension, iii) measuring a fluorescence intensity of the suspension, iv) determining the arsenic concentration of the arsenic-containing solution based on the fluorescence intensity, wherein the star-shaped nanoparticle includes silver sulfide and cesium of formula $Cs_xAg_yS_z$, wherein $0.01 \leq x \leq 0.1$, $1.5 \leq y \leq 2.5$, and $z=1$, and a sulfur heterocycle ligand of formula (VI) bound to the star-shaped nanoparticle via a sulfur atom:

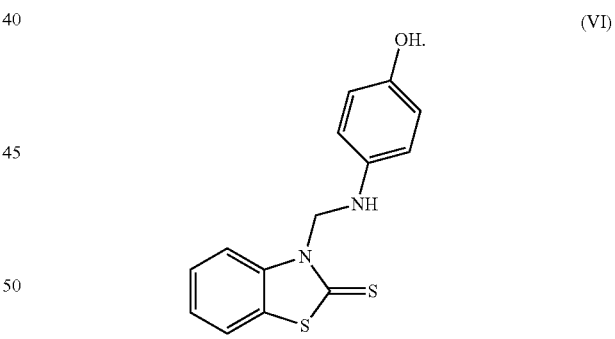

In one embodiment, the arsenic-containing solution has an arsenic concentration in the range of 0.001 ppb to 100 ppm.

In one embodiment, the arsenic-containing solution has a temperature in the range of 10 to 60° C.

In one embodiment, the arsenic-containing solution has a pH in the range of 1 to 12.

In one embodiment, the arsenic-containing solution comprises $As^{3+}$ and at least one cation selected from the group consisting of $Na^+$, $Ca^{2+}$, $Mg^{2+}$, $Cd^{2+}$, $Zn^{2+}$, $Cu^{2+}$, $Al^{3+}$, $Fe^{3+}$, and $Cr^{3+}$, and wherein the method has an arsenic selectivity of at least 60%.

According to a fourth aspect, the present disclosure relates to a method of removing arsenic from an arsenic-containing solution involving, i) mixing the star-shaped nanoparticle with the arsenic-containing solution, ii) sonicating the arsenic-containing solution to form a suspension, iii) centrifuging the suspension and removing the star-shaped nanoparticle from the suspension to form a supernatant, wherein no more than 1% of arsenic in the arsenic-containing solution is present in the supernatant.

In one embodiment, the arsenic-containing solution is one selected from the group consisting of tap water, seawater, wastewater, blood, and blood serum.

In one embodiment, a pH of the supernatant is substantially similar to a pH of the arsenic-containing solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
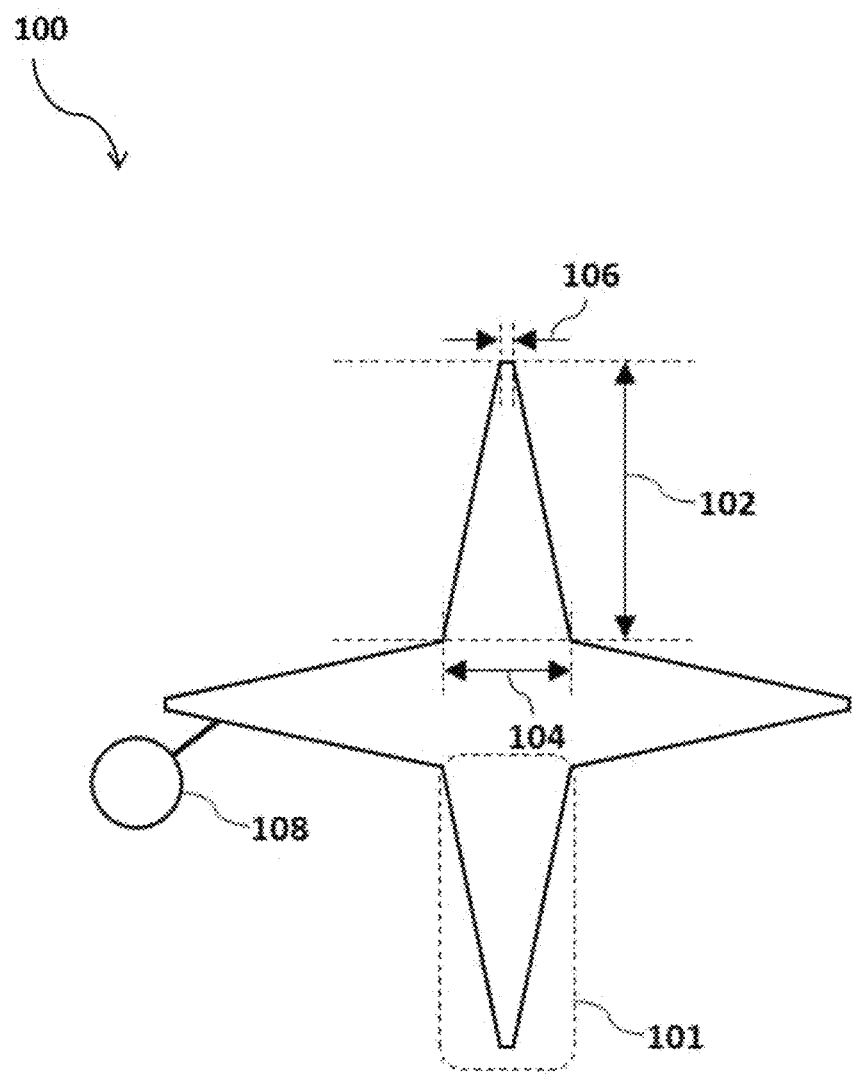
FIG. 1A illustrates a star-shaped nanoparticle.

Referring now to the drawings, wherein like reference numerals designate identical or corresponding parts throughout the several views.

According to a first aspect, the present disclosure relates to a star-shaped nanoparticle 100 including silver sulfide and cesium with a chemical formula of $Cs_xAg_yS_z$, wherein $0.01 \leq x \leq 0.1$, preferably $0.02 \leq x \leq 0.04$, wherein $1.5 \leq y \leq 2.5$, preferably $1.9 \leq y \leq 2.0$, and wherein $z=1$. In a preferred embodiment, the star-shaped nanoparticle 100 has a chemical formula of $Cs_{0.03}Ag_{1.97}S$.

The term "nanoparticle" as used herein refers to a particle with a size of no more than 400 nm, preferably no more than 350 nm, more preferably no more than 300 nm.

Referring now to FIG. 1A. In one preferred embodiment, the star-shaped nanoparticle 100 (alternatively referred to as a "starfish" shape) includes four conical arms 101 each with a longitudinal axis that is substantially perpendicular to that of an adjacent arm. The term "substantially perpendicular" as used herein may refer to an embodiment, wherein an angle between the longitudinal axis of an arm and that of an adjacent arm is in the range of 75 to 105°, preferably 80 to 100°, more preferably 85 to 95°. In a preferred embodiment, the longitudinal axis of an arm is perpendicular (i.e. having a 90° angle) to that of an adjacent arm.

Further in another preferred embodiment, the star-shaped nanoparticle 100 includes four identical conical arms 101 each with a cone height 102 of about 100 to 150 nm, preferably about 110 to 150 nm, more preferably about 120 to 150 nm. Furthermore, each arm 101 may have a cone base diameter 104 of about 40 to 60 nm, preferably 45 to 60 nm, more preferably 45 to 55 nm. Also, each arm 101 may have a cone tip diameter 106 of about 5 to 20 nm, preferably 5 to 15 nm, more preferably 10 to 16 nm.

The star-shaped nanoparticle may include more than four arms, for example, five, six, seven, or eight arms, but no more than ten arms, wherein said arms may be identical or different is geometry and/or dimension. For example, each arm of the star-shaped nanoparticle may have a cylindrical shape (e.g. a rod), or a pyramidal shape, with the height being similar to that of the adjacent arm. Or, each arm of the star-shaped nanoparticle may have a cylindrical shape (e.g. a rod), or a pyramidal shape, with the height being different than that of the adjacent arm. Such particles that include more than four arms may also be described as "star-shaped" herein.

In one embodiment, the star-shaped nanoparticle 100 has a mean particle size of no more than 400 nm, preferably no more than 350 nm, more preferably no more than 300 nm.

In one embodiment, the star-shaped nanoparticle 100 has a monoclinic crystal structure. The term "monoclinic crystal structure" refers to a crystal that is described by three unequal-length vectors that form a rectangular prism with a parallelogram base, wherein two of said vectors are substantially perpendicular, while the third vector meets the other two at an angle other than 90°. In view of that, silver sulfide forms the monoclinic crystal structure in the form of a rectangular prism, wherein a cesium atom is located at the center of the rectangular prism. Preferably, a molar ratio of Cs:Ag:S is in the range of 0.01:1.5:1 to 0.1:2.5:1, preferably 0.02:1.9:1 to 0.04:2:1, more preferably about 0.03:1.97:1.

Referring now to FIG. 1A, in a preferred embodiment, a sulfur heterocycle ligand 108 is bound to the star-shaped nanoparticle 100. The term "sulfur heterocycle ligand" refers to an organic compound that includes a heterocycle moiety, for example with sulfur and, optionally nitrogen as heteroatoms of the heterocycle moiety. Other heteroatoms such as oxygen, boron, phosphorous, arsenic, antimony, bismuth, silicon, or tin may also be present in the structure of the heterocycle moiety. The sulfur heterocycle ligand may include a 7-membered ring, a 6-membered ring, and/or preferably a 5-membered ring heterocycle moiety. The heterocycle moiety may also be a bicyclic or a polycyclic compound. Preferably, the sulfur heterocycle ligand is bound to the star-shaped nanoparticle 100 via a sulfur atom present in the heterocycle moiety. The bond between the sulfur atom and the star-shaped nanoparticle may be covalent, ionic, dative or a combination of these types of bonding.

In one embodiment, the sulfur heterocycle ligand 108 has a structure of formula (I), a structure of formula (II), or a structure of formula (III):

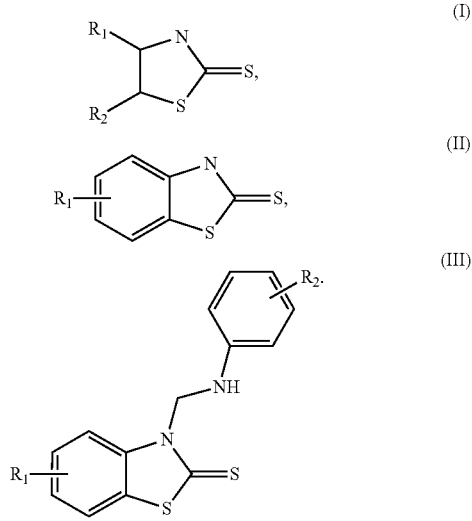

Accordingly, $R_1$ and $R_2$ are independently a hydrogen, a hydroxyl, a halogen atom, a cyano, a nitro, an optionally substituted alkyl, an optionally substituted cycloalkyl, an optionally substituted cycloalkylalkyl, an optionally substituted arylalkyl, an optionally substituted heteroaryl, an optionally substituted aryl, or an optionally substituted heterocyclyl.

The term "halogen atom" as used herein refers to any atom selected from the group 17 of the periodic table, preferably fluorine (F), chlorine (Cl), bromine (Br), or iodine (I).

The term "alkyl" as used herein refers to a straight, branched, or cyclic hydrocarbon fragment, with a general formula of $C_nH_{2n+1}$, wherein n ranges from 1 to 20, preferably 1 to 10. Such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl. As used herein, the term "cyclic hydrocarbons" refers to cyclized alkyl groups. Exemplary cyclic hydrocarbon (i.e. cycloalkyl) groups include, but are not limited to, cyclopropyl, cyclobutyl, cyclopentyl, cyclohexyl, norbornyl, and adamantyl. Branched alkyl groups, such as 1-methylcyclopropyl and 2-methycyclopropyl groups, are included in the definition of cycloalkyl as used in the present disclosure.

The term "cycloalkyl" as used refers to a cyclic alkyl having 3 to 7 carbon atoms and includes cyclopropyl, cyclobutyl, cyclopentyl, cyclohexyl, cycloheptyl. Further, "substituted cycloalkyl" may refer to cyclopropyl, cyclobutyl, cyclopentyl, cyclohexyl, or cycloheptyl substituted by at least one substituent selected from halogen (e.g. chlorine, bromine, fluorine or iodine), amino, nitro, hydroxy, alkyl, alkoxy (i.e. straight or branched chain alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy), cycloalkyloxy including cyclopentyloxy, cyclohexyloxy and cycloheptyloxy, aryloxy including phenoxy and phenoxy substituted with halo, alkyl, alkoxy, haloalkyl which means straight or branched chain alkyl having 1 to 8 carbon atoms which are substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-trifluoroethyl, 2,3,3-trifluoropropyl, 1,1,2,2-tetrafluoroetbyl, 2,2,3,3-tetrafluoropropyl.

The term "cycloalkylalkyl" as used herein refers to a straight or branched chain alkyl moiety having 1 to 8 carbon atoms that is substituted by a cycloalkyl group having 3 to 7 carbon atoms, and includes, for example, cyclopropylcarbinyl (i.e., carbinyl may also be termed methyl in this context), cyclobutylcarbinyl, cyclopentylcarbinyl, cyclohexylcarbinyl, cycloheptylmethyl, 2-cyclo-propylethyl, 2-cyclopentylethyl, 2-cyclohexylethyl, 3-cyclopropylpropyl, 3-cyclopentylpropyl, 3-cyclohexylpropyl, 4-cyclopropylbutyl, 4-cyclopentylbutyl, cyclohexylbutyl, 6-cyclopropylhexyl, 6-cyclohexylhexyl.

The term "arylalkyl" as used herein may include those radicals in which an aryl group is attached to an alkyl group (e.g., benzyl, phenethyl, pyridylmethyl, etc.) including those alkyl groups in which a carbon atom containing group (e.g., a methylene group) has been replaced by, for example, an oxygen atom (e.g., phenoxymethyl, 2-pyridyloxymethyl, 3-(1-naphthyloxy)propyl, etc.).

The term "heteroaryl" as used in this disclosure refers to 5 to 10 membered mono- or fused-hetero-aromatic rings which have at least one hetero atom selected from nitrogen, oxygen, and sulfur, and includes, for example, 2-furyl, 3-furyl, 2-thienyl, 3-thienyl, 2-pyridyl, 3-pyridyl, 4-pyridyl, pyrazolyl; imidazolyl, pyrimidinyl, pyridazinyl, pyrazinyl, benzimidazolyl, quinolyl, oxazolyl, thiazolyl, indolyl. Further, "substituted heteroaryl" may refer to 5 to 10 membered mono- or fused-heteroaromatic ring which has in the ring at least one hetero atom selected from nitrogen, oxygen, and sulfur, and which ring is substituted by at least one substituent selected from halogen, amino, vitro, hydroxy, alkyl, alkoxy and haloalkyl on the above-mentioned heteroaromatic nucleus.

The term "aryl" as used herein refers to phenyl, biphenyl, naphthyl, anthracenyl, and includes heteroaryl that can be furyl, imidazolyl, triazolyl, triazinyl, oxazolyl, isoxazolyl, thiazolyl, isothiazolyl, pyrazolyl, pyrrolyl, pyrazinyl, tetrazolyl, pyridyl, (or its N-oxide), thienyl, pyrimidinyl (or its N-oxide), 1H-indolyl, isoquinolyl (or its N-oxide) or quinolyl (or its N-oxide). Further, the term "substituted aryl" may refer to phenyl, naphthyl, or biphenyl substituted by at least one substituent selected from aroyl (as defined below), halogen (e.g. chlorine, bromine, fluorine or iodine), amino, vitro, hydroxy, alkyl, alkoxy (i.e. straight or branched chain alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy), cycloalkyloxy including cyclopentyloxy, cyclohexyloxy and cycloheptyloxy, aryloxy including phenoxy and phenoxy substituted with halo, alkyl, alkoxy, haloalkyl which means straight or branched chain alkyl having 1 to 8 carbon atoms which are substituted by at least one halogen, and includes, for example, chloromethyl, bromomethyl, fluoromethyl, iodomethyl, 2-chloroethyl, 2 bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-ifluoropropyl, 4,4-ichlorobutyl, 4,4-difluorobutyl, trichloromethyl, trifluoromethyl, 2,2,2-tri-fluoroethyl, 2,3,3-trifluoropropyl, 1,1,2,2-tetrafluoroethyl, 2,2,3,3-tetrafluoropropyl.

The term "heterocyclyl" as used herein refers to a 3-8, preferably 4-8, more preferably 4-7 membered monocyclic ring or a fused 8-12 membered bicyclic ring which may be saturated or partially unsaturated, which monocyclic or bicyclic ring contains 1 to 4 heteroatoms selected from oxygen, nitrogen, silicon or sulfur. Examples of such monocyclic rings include oxaziridinyl, oxiranyl, dioxiranyl, aziridinyl, pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridyl, tetrahydropyrimidinyl, tetrahydrothiophenyl, tetrahydrothiopyranyl, diazepanyl and azepanyl. Examples of such bicyclic rings include indolinyl, isoindolinyl, benzopyranyl, quinuclidinyl, 2,3,4,5-tetrahydro-1,3,benzazepine, 4-(benzo-1,3,dioxol-5-methyl)piperazine, and tetrahydroisoquinolinyl. Further, "substituted heterocyclyl" may refer to a heterocyclyl ring which has one or more oxygen atoms bonded to the ring (i.e. as ring atoms). Preferably, said atom which is bonded to the ring selected from nitrogen or sulphur. An example of a heterocyclyl substituted with one or more oxygen atoms is 1,1-dioxido-1,3-thiazolidinyl.

In some preferred embodiments, the sulfur heterocycle ligand 108 has a structure of formula (IV), i.e. thiazolidine-2-thione, a structure of formula (V), i.e. benzothiazoline-2-thione, or a structure of formula (VI), i.e. 3-(4-hydroxyanilinomethyl)benzothiazoline-2-thione:

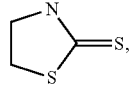

(IV)

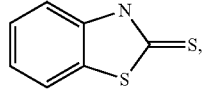

(V)

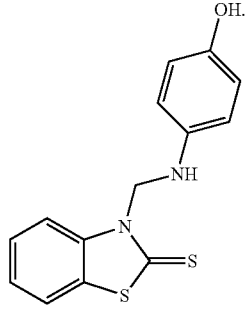

(VI)

In one embodiment, the sulfur heterocycle ligand bonded to the star-shaped nanoparticle chelates arsenic via the nitrogen atom present in the heterocycle moiety and either the sulfur atom of the 2-thione moiety or a pendent nitrogen attached to the nitrogen atom present in the heterocycle moiety, as in formula (III) or formula (VI). The sulfur heterocycle ligand may also chelate other metals and cations such as nickel, platinum, rhodium, gold, silver, ruthenium, and iridium.

Figure 1B:
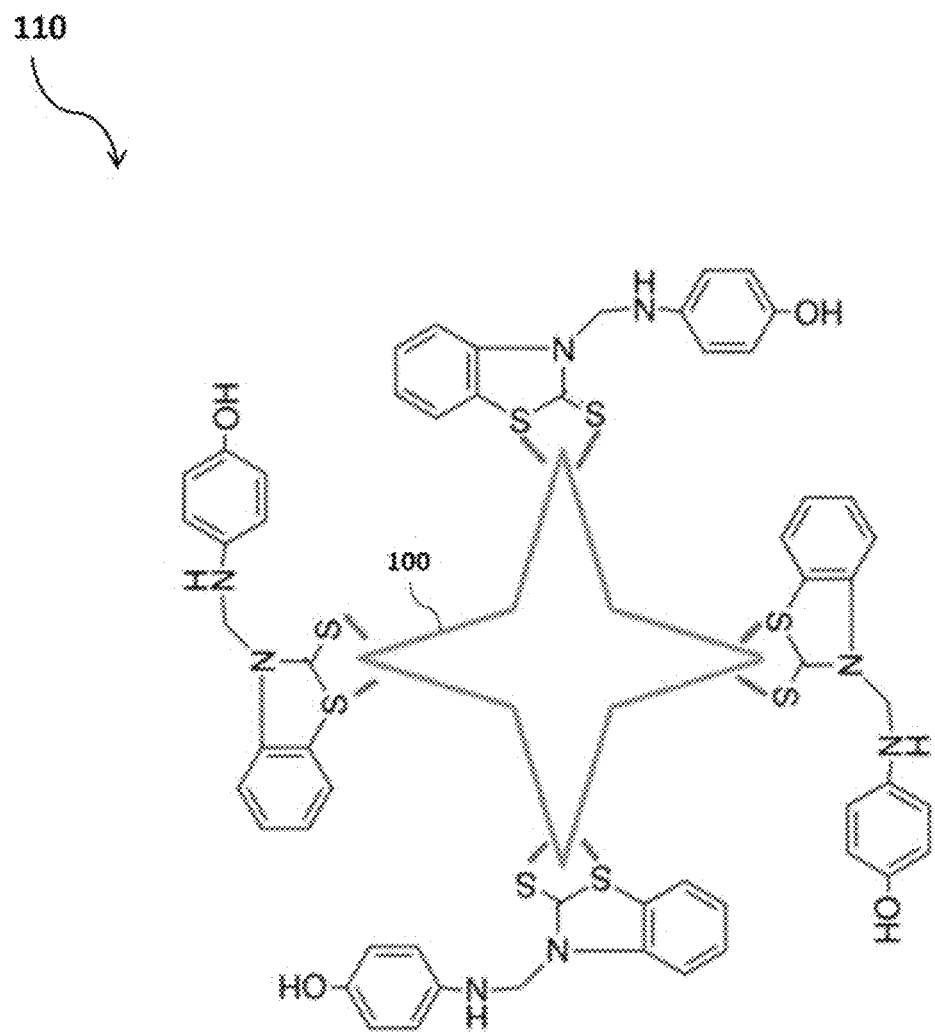
FIG. 1B illustrates a star-shaped nanoparticle sulfur heterocycle complex, i.e. nanoparticle 110.

Referring now to FIG. 1B, in the most preferred embodiment, sulfur heterocycle ligands with a structure of formula (VI), i.e. 3-(4-hydroxyanilinomethyl)benzothiazoline-2-thione ligands, are bound to the star-shaped nanoparticle 100 via one or more sulfur atoms present in the heterocycle moiety of said ligand to form the star-shaped nanoparticle bonded to the sulfur heterocycle ligands, i.e. the nanoparticle 110. Preferably, less than 5 wt %, more preferably less than 2 wt %, even more preferably less than 1 wt % of the nanoparticle 110 includes 3-(4-hydroxyanilinomethyl)benzothiazoline-2-thione ligands, with the weight percent being relative to the total weight of the nanoparticle 110. In view of that, the term "nanoparticle 110" refers to the star-shaped nanoparticle functionalized with 3-(4-hydroxyanilinomethyl)benzothiazoline-2-thione ligands.

In one embodiment, the sulfur heterocycle ligands are present on a single arm of the star-shaped nanoparticle. Preferably, said ligands are present on two of the arms, more preferably three of the arms, most preferably four of the arms of the star-shaped nanoparticle.

In another embodiment, a sulfur heterocycle ligand such as one or more of the ligands (IV), (V), or (VI) is bound to the star-shaped nanoparticle via two sulfur atoms, wherein one sulfur atom is present in the heterocycle moiety, and the other sulfur atom is outside the heterocycle moiety (i.e. the 2-thione group).

According to a second aspect, the present disclosure relates to a method of producing the star-shaped nanoparticle including mixing a silver-containing compound with a cesium-containing compound and a dihydroxy compound such as a dihydroxy alkane to form a first solution.

The silver-containing compound may be one or more of a silver salt, silver alkoxide, and silver alkanoate. Exemplary silver-containing compounds include but not limited to, silver acetate, silver acetylide, silver azide, silver behenate, silver bromate, silver bromide, silver carbonate, silver chlorate, silver chloride, silver chromate, silver cyanate, silver cyanide, silver diamine fluoride, silver dichromate, silver fulminate, silver halide, silver hexafluorophosphate, silver iodate, silver iodide, silver molybdate, silver nitrate, silver nitride, silver nitrite, silver oxalate, silver oxide, silver perchlorate, silver permanganate, silver perrhenate, silver phosphate, silver proteinate, silver selenite, silver subfluoride, silver sulfadiazine, silver sulfate, silver sulfide, silver sulfite, silver telluride, silver tetrafluoroborate, silver thiocyanate, silver trifluoromethanesulfonate, silver oxide, silver fluoride, silver selenide. In some preferred embodiment, the silver-containing compound is one or more of silver cyclohexanebutyrate, silver heptafluorobutyrate, silver lactate, silver pentafluoropropionate, silver tetrafluoroborate, and silver p-toluenesulfonate. Most preferably, the silver-containing compound is silver cyclohexanebutyrate.

In addition, the cesium-containing compound includes cesium oxalate, and may further include cesium carbonate, cesium chloride, cesium fluoride, cesium iodide, cesium bromide, cesium trifluoroacetate, cesium formate, cesium hydroxide, cesium nitrate, and/or cesium sulfate. However, in a preferred embodiment, the cesium-containing compound is cesium oxalate.

The dihydroxy alkane as used herein refers to an organic hydrocarbon compound with a general formula of $C_nH_{2n}(OH)_2$, wherein n ranges from 1 to 20, preferably 1 to 10. In some preferred embodiments, the dihydroxy alkane is at least one compound selected from the group consisting of ethylene glycol, propylene glycol, and butylene glycol. However, in the most preferred embodiment, the dihydroxy alkane compound is ethylene glycol.

In some embodiments, a weight ratio of the silver-containing compound to that of the cesium-containing compound is in the range of 45:1 to 55:1, preferably about 50:1. In addition, the amount of the silver-containing compound per volume of the dihydroxy alkane is in the range of 0.4 g/L to 0.7 g/L, preferably 0.5 g/L to 0.6 g/L, more preferably about 0.52 g/L. For example, in one embodiment, 20 to 40 mg, preferably 20 to 30 mg of the silver-containing compound is mixed with 0.5 to 5 mg, preferably 0.5 to 1 mg, more preferably about 0.5 mg of the cesium-containing compound, and 20 to 100 ml, preferably 40 to 80 ml, more preferably about 50 ml of the dihydroxy alkane in a flask, to form the first solution.

The method of producing the star-shaped nanoparticle further involves heating the first solution to a temperature of 100 to 150° C., preferably 110 to 130° C., more preferably about 120° C., in an inert atmosphere. The inert atmosphere may be provided by purging the flask with argon, helium, and/or nitrogen. The first solution is optionally kept isothermally at the temperature of 100 to 150° C., preferably 110 to 130° C., more preferably about 120° C., for at least 30 minutes, preferably at least 40 minutes, optionally no more than 1 hour.

After that, a sulfide compound is mixed with the first solution to form a second solution. The sulfide compound may be an alkyl sulfide compound (i.e. $SC_nH_{2n+1}$), wherein n ranges from 1 to 10 preferably 1 to 5. In an alternative embodiment, the sulfide compound is a haloalkyl sulfide compound with a formula $XC_nH_{2n}SC_nH_{2n+1}$, wherein X is a halogen atom such as fluoride, chloride, bromide, and/or iodide, and n ranges from 1 to 10 preferably 2 to 5, more preferably 3 to 4. In another embodiment, the sulfide compound is a haloalkyl sulfide compound with a formula $XC_nH_{2n}SC_nH_nY_{3n}$, wherein X and Y are individually a halogen atom such as fluoride, chloride, bromide, and/or iodide, and n ranges from 1 to 10 preferably 2 to 5, more preferably 3 to 4. In a preferred embodiment, the sulfide compound is chloromethyl trifluoromethyl sulfide having a concentration of 0.1 to 1.0 M, preferably 0.4 to 0.6 M, more preferably about 0.5 M, wherein a volume ratio of the sulfide compound to that of the dihydroxy alkane is in the range of 1:4 to 1:6, preferably 1:5. In another embodiment, the sulfide compound may be one or more of an ammonium sulfide solution, sodium sulfide solution, lithium sulfide solution, dimethyl sulfide solution, etc., wherein a concentration of the sulfide compound is within the range of 0.1 to 1.0 M, preferably 0.4 to 0.6 M, more preferably about 0.5 M.

In one embodiment, the dihydroxy alkane is ethylene glycol, and the method of producing the star-shaped nanoparticle further involves heating the second solution to a temperature of 150 to 220° C., preferably 180 to 200° C., more preferably about 190° C., to reflux (i.e. continuously condensed and delivered to the second solution) the second solution for at least 40 minutes, preferably at least 50 minutes, but no more than 1 hour, during which nanoparticles are formed. The formed nanoparticles include silver sulfide monoclinic crystals with cesium atoms present inside said crystals. In the embodiments where the dihydroxy alkane does not include ethylene glycol, the second solution is heated to a temperature sufficient for boiling/refluxing the dihydroxy alkane.

The formation of the nanoparticles involves three distinct stages: i) reduction of silver ions into silver atoms, ii) nucleation (i.e. formation of crystallite nuclei), and iii) crystal growth by deposition of silver sulfide onto the surface of each crystallite nuclei.

The method further involves centrifuging the second solution at a preferred rotational speed of 10,000 to 15,000 rpm, preferably 14,000 to 15,000 rpm, more preferably 15,000 rpm, to form the star-shaped nanoparticles. In a preferred embodiment, the second solution is centrifuged for at least 15 minutes, preferably 20 minutes, but no more than 30 minutes, at room temperature (i.e. a temperature of 20 to 35° C., preferably 20 to 30° C.).

The star-shaped nanoparticles may be filtered and washed with an organic solvent (e.g. toluene and/or isopropanol) to remove impurities and residuals. After that, the star-shaped nanoparticles may preferably be centrifuged at a rotational speed of 4,000 to 6,000 rpm, preferably 5,000 rpm for at least 5 minutes, preferably at least 10 minutes, but no more than 15 minutes; and then dried at a temperature of 40 to 70° C., preferably 40 to 60° C., more preferably about 50° C., for at least 6 hours, preferably at least 8 hours.

In one embodiment, the method further involves treating the star-shaped nanoparticle with an aqueous solution that includes the sulfur heterocycle ligand of formula (VI).

Accordingly, a solution of the sulfur heterocycle ligand of formula (VI) is prepared by dissolving 3-(4-hydroxyanilinomethyl)benzothiazoline-2-thione hydrochloride in deionized water, followed by stirring the resulting solution at a temperature of 40 to 70° C., preferably 40 to 60° C., more preferably about 50° C., until a homogenous solution is achieved. In a preferred embodiment, the amount of the 3-(4-hydroxyanilinomethyl)benzothiazoline-2-thione hydrochloride per unit volume of deionized water is in the range of 1 g/L to 3 g/L, preferably 1 g/L to 2 g/L, more preferably about 1.12 g/L. For example, in one embodiment, 100 to 150 mg, preferably about 100 to 120 mg, more preferably about 110 mg of 3-(4-hydroxyanilinomethyl)benzothiazoline-2-thione hydrochloride is dissolved in 5 to 20 ml, preferably about 10 ml of deionized water.

Next, the star-shaped nanoparticle is mixed with the homogenous solution and refluxed at 45° C., preferably 50° C., for at least 30 minutes, preferably 35 minutes, but no more than 45 minutes. In a preferred embodiment, a weight ratio of the star-shaped nanoparticle to that of the 3-(4-hydroxyanilinomethyl)benzothiazoline-2-thione hydrochloride is in the range of 1:0.8 to 1:1.5, preferably 1:1 to 1:1.2, more preferably about 1:1.12. For example, in one embodiment, 100 mg of the star-shaped nanoparticle is mixed with the homogenous solution, which was prepared from dissolving 110 mg of 3-(4-hydroxyanilinomethyl)benzothiazoline-2-thione hydrochloride in 10 ml of deionized water.

Then, the homogenous solution is centrifuged at a rotational speed of 10,000 to 15,000 rpm, preferably 13,000 to 15,000 rpm, more preferably 14,000 rpm, for at least 5 minutes, preferably at least 10 minutes, but no more than 15 minutes. The star-shaped nanoparticles may be filtered and washed with an organic solvent (e.g. toluene and/or isopropanol), and dried under a purge flow of argon or helium. As a result, the sulfur heterocycle ligand of formula (VI), i.e. 3-(4-hydroxyanilinomethyl)benzothiazoline-2-thione, is bound to the star-shaped nanoparticle via a sulfur atom to form the nanoparticle 110, as shown in FIG. 1B.

Figure 3:
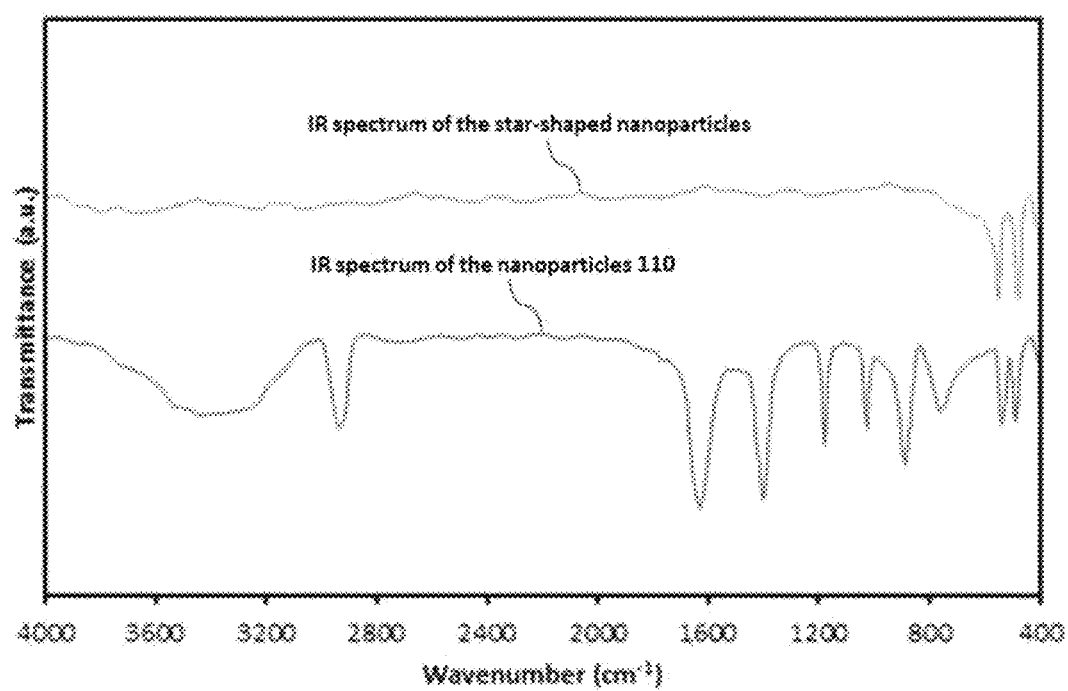
FIG. 3 represents FTIR transmittance spectra of the star-shaped nanoparticles and the nanoparticle 110.

FIG. 3 represents the infrared spectra of the star-shaped nanoparticle 100 and the nanoparticle 110, respectively. Only two bands one at a wavelength of 550-600 cm$^{-1}$ land the other at a wavelength of 450-500 cm$^{-1}$ are observed in the spectrum of the star-shaped nanoparticle. These bands correspond to the Ag—S and the Ag—S—Cs bonds, respectively. However, several bands are observed in the spectrum of the nanoparticle 110. These bands appeared at a wavelength of 3400 to 3450 cm$^{-1}$, 2925 to 2975 cm$^{-1}$, 2900 to 2925 cm$^{-1}$, 2525 to 2550 cm$^{-1}$, 1600 to 1650 cm$^{-1}$, 1390 to 1420 cm$^{-1}$, 1150 to 1200 cm$^{-1}$, 1000 to 1050 cm$^{-1}$, and 750 to 800 cm$^{-1}$ that correspond to O—H and N—H stretching, C—H symmetric stretching, C—H asymmetric stretching, S—C stretching, C—C stretching, H—C—H stretching, C—O bending, C—S—S bending, and C—S—Ag bending vibrations, respectively.

According to a third aspect, the present disclosure relates to a method of determining an arsenic concentration in an arsenic-containing solution.

The term "arsenic-containing solution" refers to an aqueous solution that contains arsenic. Exemplary arsenic-containing solutions may include seawater, tap water, wastewater, bottled water, blood, blood serum, or a water sample from a river, a lake, a pond, etc. In one embodiment, the arsenic concentration of the arsenic-containing solution is within the range of 0.001 ppb to 100 ppm, preferably 0.001 ppb to 20 ppm, more preferably 0.01 ppb to 20 ppm, although an arsenic concentration of the arsenic-containing solution can still be determined if the arsenic concentration falls outside of these preferable ranges.

The method involves mixing the nanoparticle 110 with the arsenic-containing solution. Accordingly, a suspension of the nanoparticle 110 is prepared by mixing a predetermined amount of the nanoparticle 110 in the arsenic-containing solution. In a preferred embodiment, the predetermined amount of the nanoparticle 110 per unit volume of the arsenic-containing solution is 1 to 3 g/L, preferably 1.5 to 2.5 g/L, more preferably 2 g/L. For example, in one embodiment, about 0.1 g of the nanoparticle 110 is mixed with 50 ml of the arsenic-containing solution.

The method of determining optionally further involves sonicating the arsenic-containing solution to de-agglomerate the nanoparticle 110 and to disperse the same in the suspension. Preferably, the arsenic-containing solution is sonicated at room temperature (i.e. a temperature of 20 to 35° C., preferably 20 to 30° C.), for at least 10 minutes, preferably 15 minutes, but no more than 30 minutes.

The method of determining further involves measuring a fluorescence intensity of the suspension via a fluorescence spectrometer. The fluorescence spectrometer includes a light source, which may emit many different wavelengths of light. Since a light with a desired wavelength in the range of 820 to 940 nm, preferably 840 to 920 nm is preferred for a fluorescence spectroscopy of arsenic, undesired wavelengths of light are filtered by passing the light through an excitation monochromator, and the preferred wavelengths may further be passed through the suspension. After absorption and re-emission of the wavelengths by the suspension, many wavelengths may emerge due to Stokes shift and various electron transitions. These re-emitted wavelengths may be separated by passing them through an emission monochromator. Re-emitted wavelengths may further be counted by a detector of the fluorescence spectrometer.

The method of determining further involves determining the arsenic concentration of the arsenic-containing solution based on the fluorescence intensity.

Figure 4A:
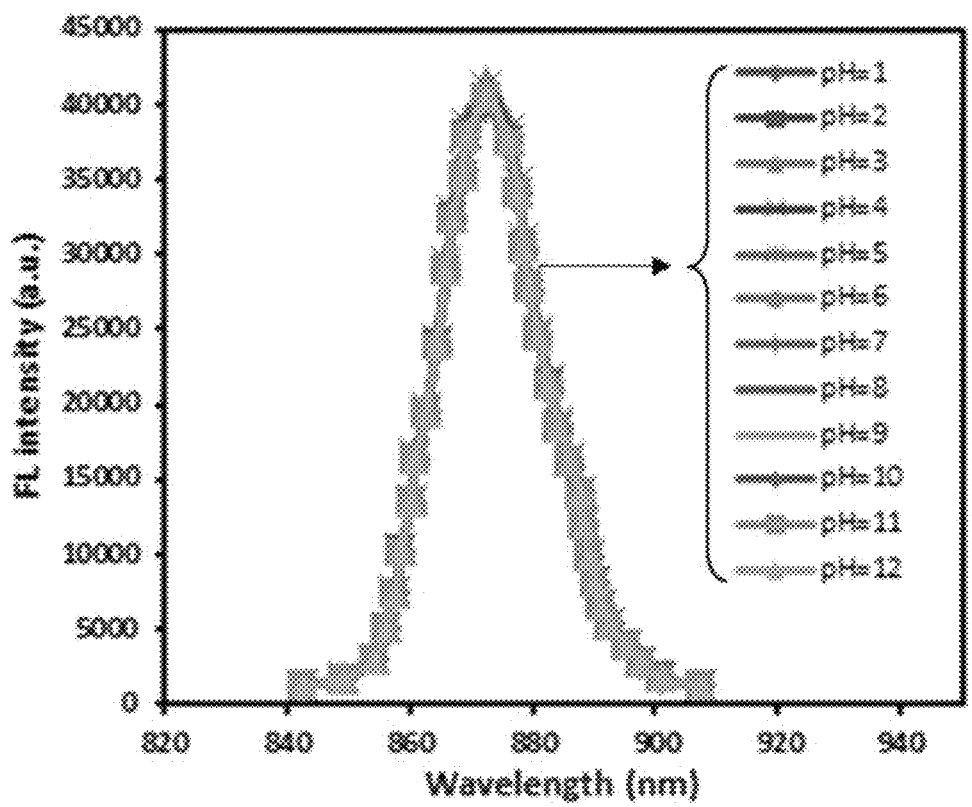
FIG. 4A represents fluorescence spectra of the nanoparticle 110, at different pH of the suspension.
Figure 4B:
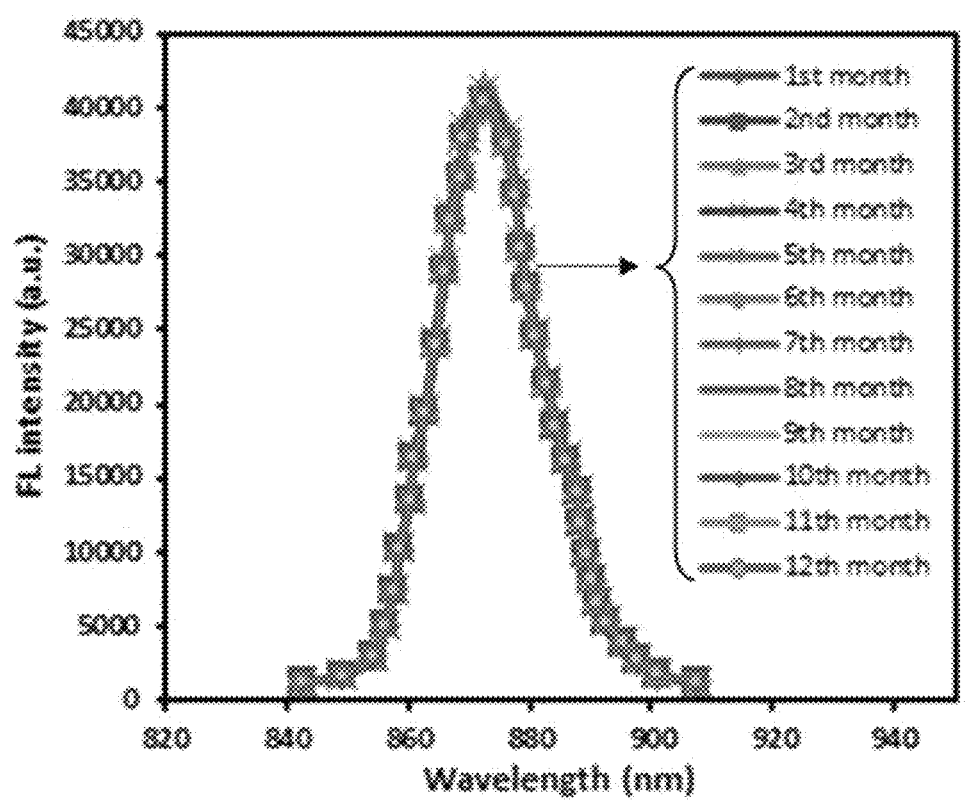
FIG. 4B represents fluorescence spectra of the nanoparticle 110, at different storage time of the suspension.
Figure 4C:
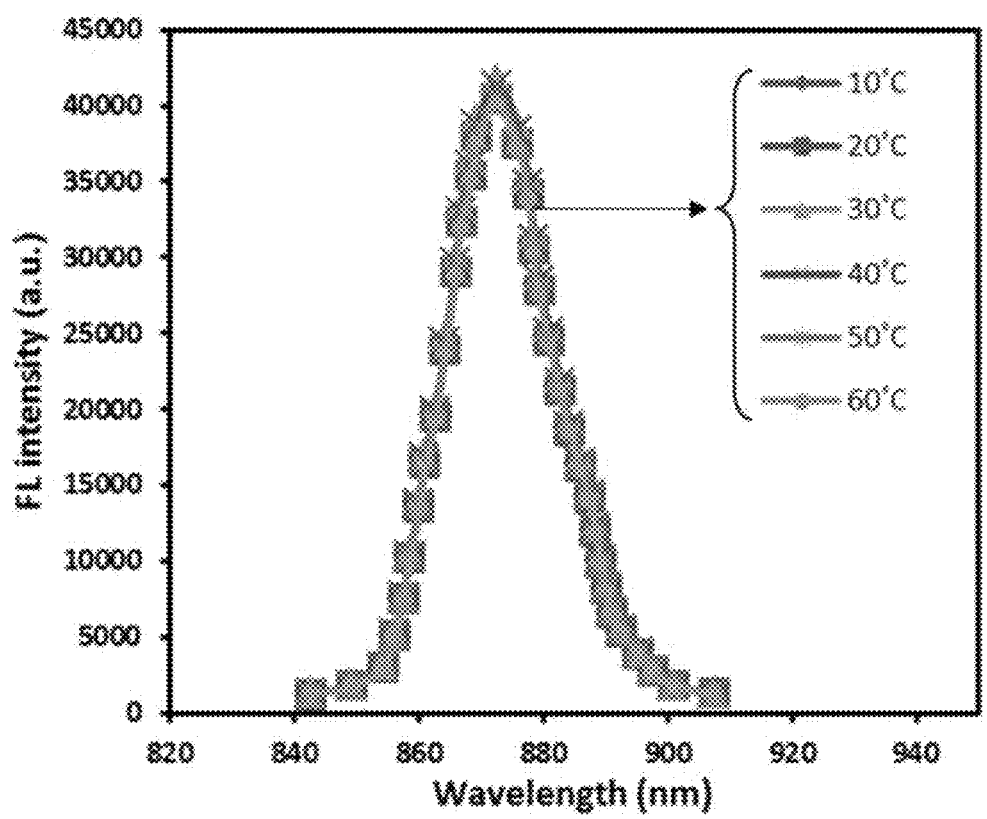
FIG. 4C represents fluorescence spectra of the nanoparticle 110, at different temperature of the suspension.
Figure 4D:
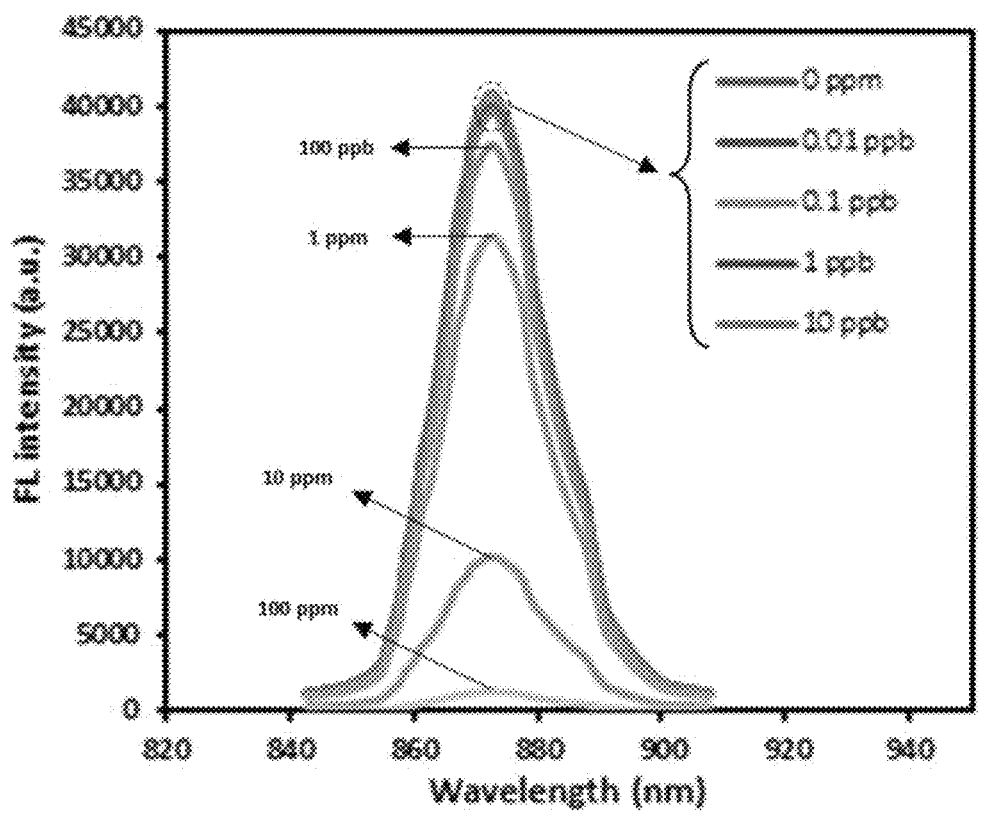
FIG. 4D represents fluorescence spectra of the nanoparticle 110, at different arsenic concentration of the suspension, which is an aqueous solution.
Figure 4E:
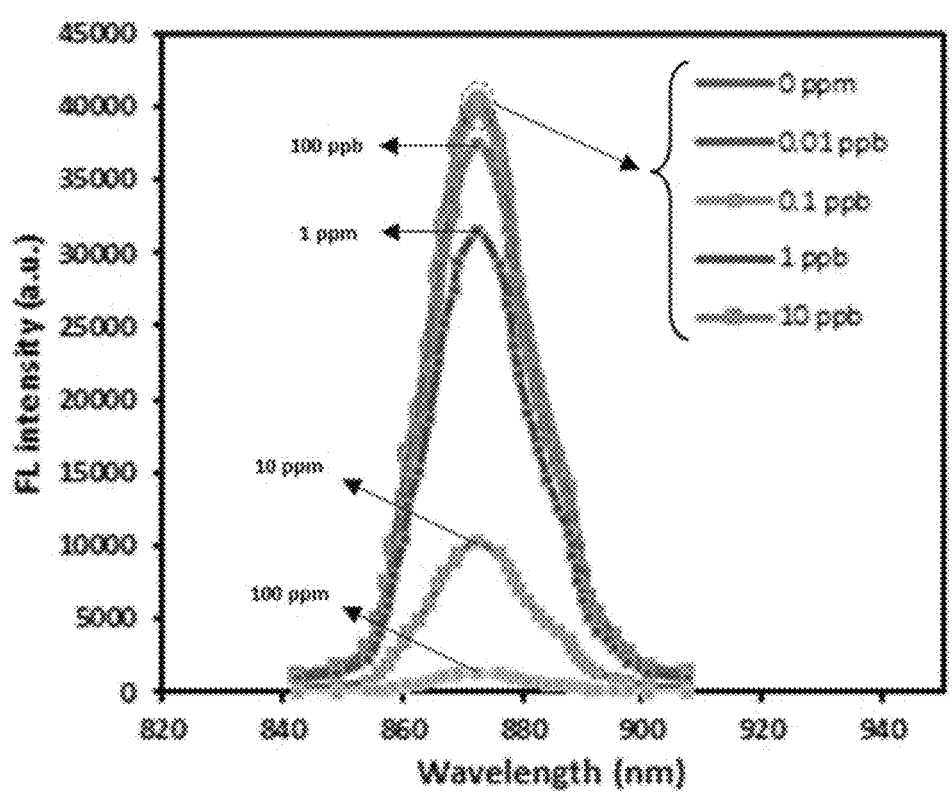
FIG. 4E represents fluorescence spectra of the nanoparticle 110, at different arsenic concentration of the suspension, which is a blood serum.

As used herein, the term "determining" refers to a quantitative measurement from which the arsenic concentration in the arsenic-containing solution can be calculated or derived. For example, in one embodiment, a peak height or a peak area of the peak appeared in the fluorescence intensity vs. wavelength (as shown in FIG. 4D or FIG. 4E) is used to measure the arsenic concentration in the arsenic-containing solution. Accordingly, the nanoparticle 110 is a fluorescent material, which is capable of absorbing a light photon and emitting a visible and/or invisible light. On the other hand, the nanoparticle 110 is capable of chelating arsenic. As a result, the fluorescence intensity of the nanoparticle 110 may be different, when comparing a nanoparticle 110 that has chelated arsenic versus the same without chelating arsenic.

Figure 5A:
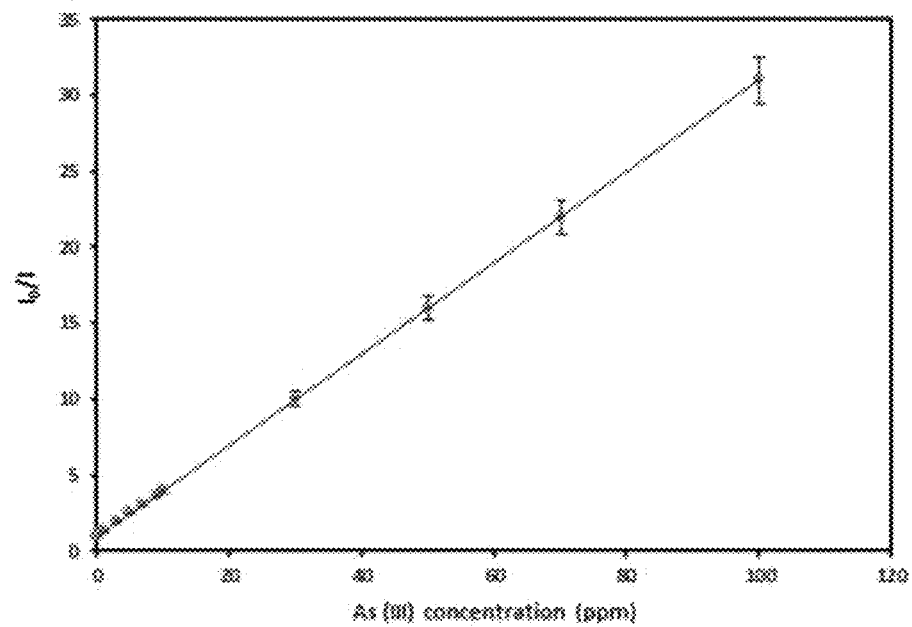
FIG. 5A represents a calibration curve of fluorescence intensity vs arsenic concentration in an aqueous solution.
Figure 5B:
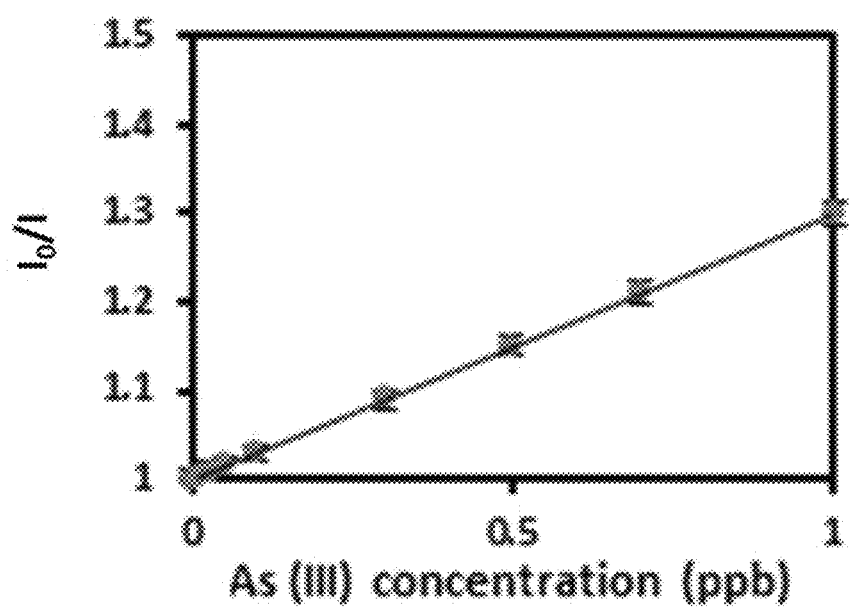
FIG. 5B represents the calibration curve of the aqueous solution at very low arsenic concentrations.
Figure 5C:
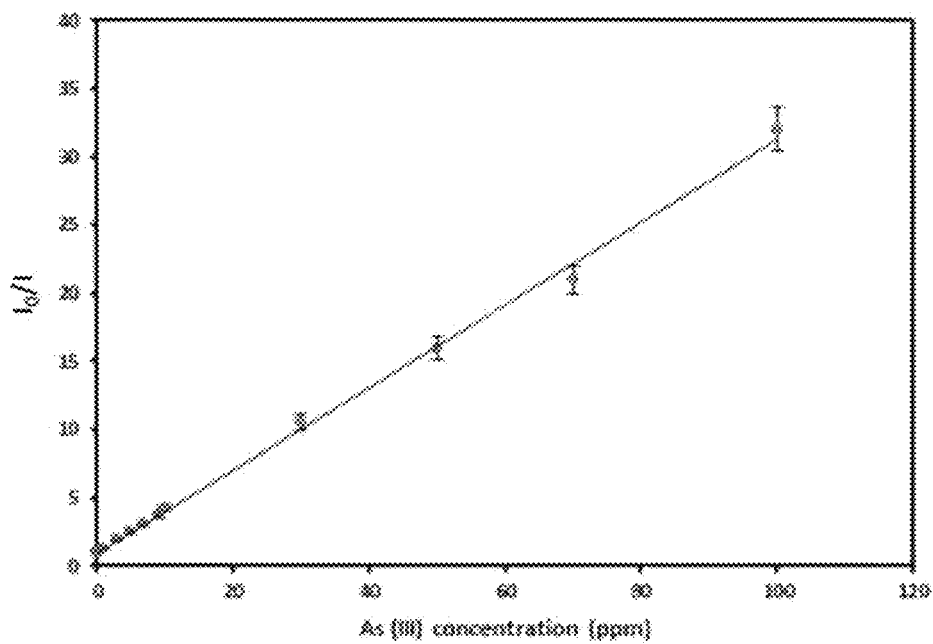
FIG. 5C represents a calibration curve of fluorescence intensity vs arsenic concentration in a blood serum.
Figure 5D:
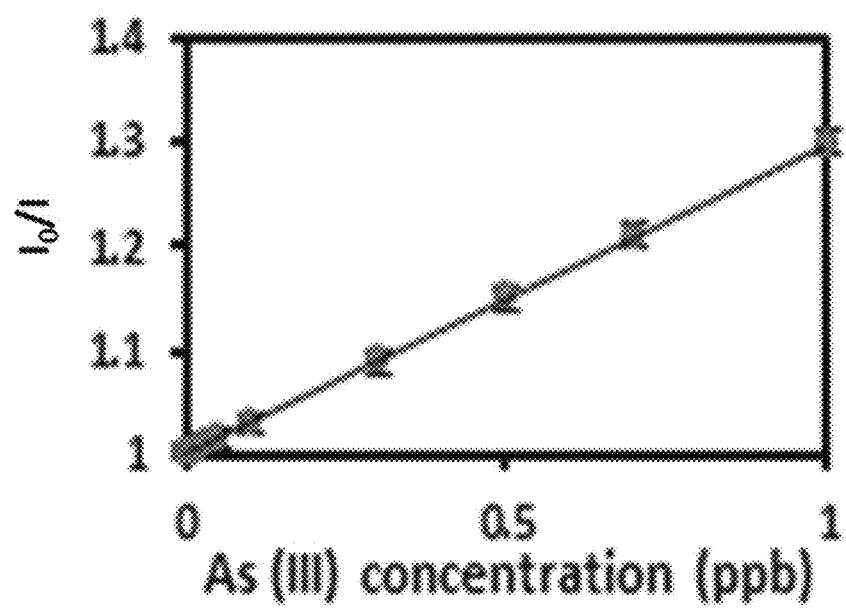
FIG. 5D represents the calibration curve of the blood serum at very low arsenic concentrations.

In another embodiment, a calibration curve is generated from a plurality of arsenic-containing solutions having arsenic concentrations that range from 0.001 ppb to 100 ppm, as shown in FIGS. 5A and 5C. As a result, the calibration curve relates the fluorescence intensity to the arsenic concentration. According to the calibration curve, the fluorescence intensity is found to be linearly dependent to the arsenic concentration in the presence of the nanoparticle 110 based on the following linear equation:

$$\frac{I_0}{I} = 1 + K_{SV} C$$

wherein $I_0$ is an initial fluorescence intensity of the nanoparticle 110 in the absence of arsenic, I is the fluorescence intensity of the nanoparticle 110 in the presence of arsenic, C is a concentration of arsenic in a sample, and $K_{SV}$ is the Stern-Volmer constant, which is found to be within the range of 0.002 to 0.004 per unit concentration, preferably about 0.003 per unit concentration. The calibration curve and the Stern-Volmer constant may relate to several characteristics of the nanoparticle 110, for example, composition, size, geometry, ligand structure, etc.

The term "determining" may also refer to a qualitative measurement to determine the presence of arsenic within a solution.

In some embodiments, the nanoparticle 110 is utilized to determine an arsenic concentration of a blood sample or a blood serum. In view of that, the nanoparticle 110 may be used for in-vivo or in-vitro arsenic measurement of the blood sample. Accordingly, the term, "in vitro" is defined herein as being an artificial environment outside the living organism (e.g., a petri dish or a test tube), whereas the term "in vivo" refers to a process that occurs in a living organism. In a preferred embodiment, the nanoparticles 110 may be adhered to a substrate, which may be as small as the size of a body vein in a human body. The substrate is imbedded in a living organism for a specific amount of time, although the fluorescence intensity measurement is still carried out outside the living organism.

In one embodiment, the arsenic-containing solution includes $As^{3+}$ and at least one cation selected from the group consisting of $Na^+$, $Ca^{2+}$, $Mg^{2+}$, $Cd^{2+}$, $Zn^{2+}$, $Cu^{2+}$, $Al^{3+}$, $Fe^{3+}$, and $Cr^{3+}$. In view of that, the method of determining an arsenic concentration has an arsenic selectivity of at least 60%, preferably at least 70%, or preferably at least 80%, or preferably at least 90%. The term "arsenic selectivity" refers to a molar ratio of total arsenic chelated to a surface of a nanoparticle 110 relative to the total cations chelated to the surface of the nanoparticle 110. For example, if the arsenic selectivity is 90%, that means 90% of the total cations chelated to the surface of the nanoparticles 110 are arsenic.

In a preferred embodiment, the method of determining the arsenic concentration is insensitive to the pH of the arsenic-containing solution. As a result, the arsenic-containing solution may have any pH, preferably a pH in the range of 1 to 12, or preferably 2 to 12, more preferably 3 to 12.

The term "insensitive" as used herein refers to an embodiment, wherein a measuring quantity is not substantially correlated with an independent variable. In view of that, a variation of the measuring quantity is no more than 0.5%, preferably no more than 0.1%, more preferably no more than 0.05% by changing the independent variable. For example, the phrase "the arsenic concentration is insensitive to the pH of the arsenic-containing solution" as used herein refers to an embodiment, wherein a variation in the detected arsenic concentration is no more than 0.5%, preferably no more than 0.1%, more preferably no more than 0.05%, when the pH of the arsenic-containing solution is varied.

In another embodiment, the method of determining the arsenic concentration is insensitive to the temperature of the arsenic-containing solution when the temperature is in the range of 10 to 60° C., preferably 15 to 60° C., more preferably 20 to 60° C.

In another embodiment, the method of determining the arsenic concentration is insensitive to the amount of time that the arsenic-containing solution is stored. Accordingly, an arsenic concentration determined from an arsenic-containing solution after one month is similar to the arsenic concentration determined from the arsenic-containing solution after 12 months, when the arsenic-containing solution is stored at a temperature of 5 to 25° C., preferably 10 to 15° C., more preferably about 10° C.

According to a fourth aspect, the present disclosure relates to a method of removing arsenic from the arsenic-containing solution. Accordingly, the method involves mixing the nanoparticles 110 with the arsenic-containing solution, and optionally sonicating the arsenic-containing solution to form a suspension. The mixing and the sonicating in this aspect may preferably be substantially similar to the mixing and the sonicating in accordance with the third aspect.

The method of removing arsenic further involves centrifuging the suspension or separating the solids from the suspension. In view of that, the suspension is centrifuged at a rotational speed of 10,000 to 15,000 rpm, preferably 13,000 to 15,000 rpm, more preferably 14,000 rpm, for at least 5 minutes, preferably at least 10 minutes, but no more than 15 minutes, wherein the nanoparticles 110 are removed from the suspension to form a supernatant (i.e. a liquid phase lying above the nanoparticles 110 after the centrifuging). As described previously, the nanoparticles 110 chelate arsenic, and thus forming a relatively arsenic-free solution. Accordingly, no more than 1 wt %, preferably no more than 0.1 wt %, preferably no more than 0.01 wt %, preferably no more than 0.001 wt % of arsenic initially presented in the arsenic-containing solution is now present in the supernatant.

The method of removing may not alter a pH, and thus the pH of the supernatant is substantially similar to the pH of the arsenic-containing solution.

In another embodiment, the method of removing may not alter a concentration of non-arsenic dissolved cations in the arsenic-containing solution. For example, in one embodiment, in addition to arsenic the arsenic-containing solution includes at least one cation selected from the group consisting of $Na^+$, $Ca^{2+}$, $Mg^{2+}$, $Cd^{2+}$, $Zn^{2+}$, $Cu^{2+}$, $Al^{3+}$, $Fe^{3+}$, and $Cr^{3+}$, wherein a concentration of each of said cations in the arsenic-containing solution is similar to the concentration of the cation in the supernatant. In another embodiment, the concentration of each of said cations in the supernatant may be lower than the concentration of the cation in the arsenic-containing solution, but no more than 1%, preferably no more than 0.5%, more preferably no more than 0.1%, with each percentile being relative to the concentration of the cation in the arsenic-containing solution.

The examples below are intended to further illustrate protocols for the star-shaped nanoparticles, the method of producing same, and the method of using same to determine an arsenic concentration in an arsenic-containing solution, and are not intended to limit the scope of the claims.

Example 1—Preparation of $Cs_{0.03}Ag_{1.97}S$ with Starfish Like Shape

Figure 1C:
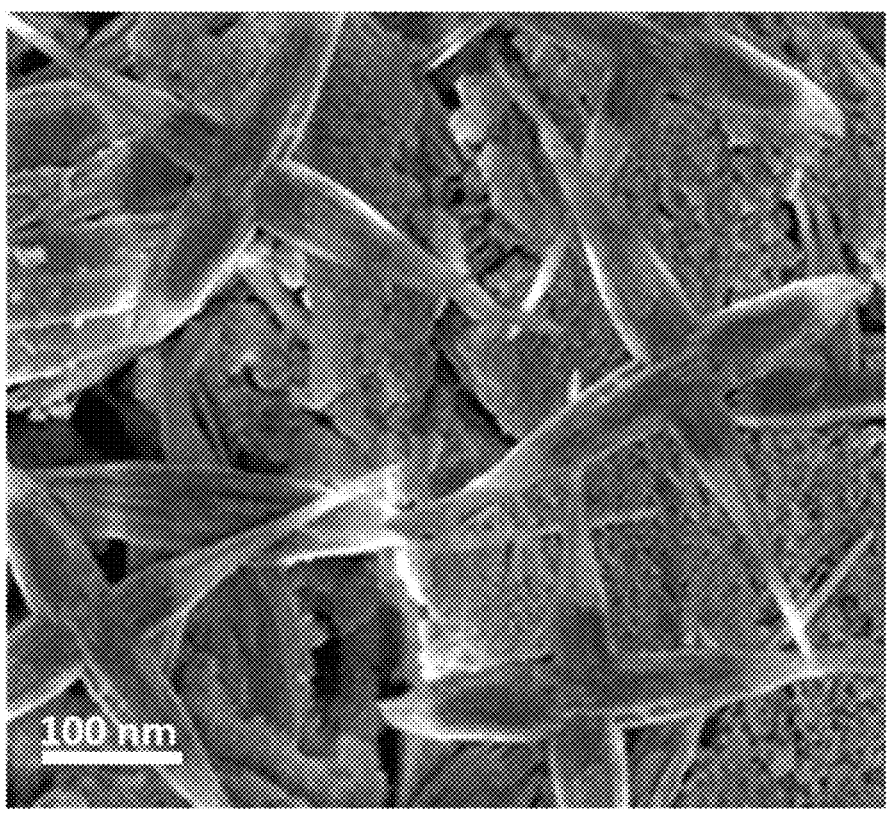
FIG. 1C is a SEM micrograph of the star-shaped nanoparticles.
Figure 2:
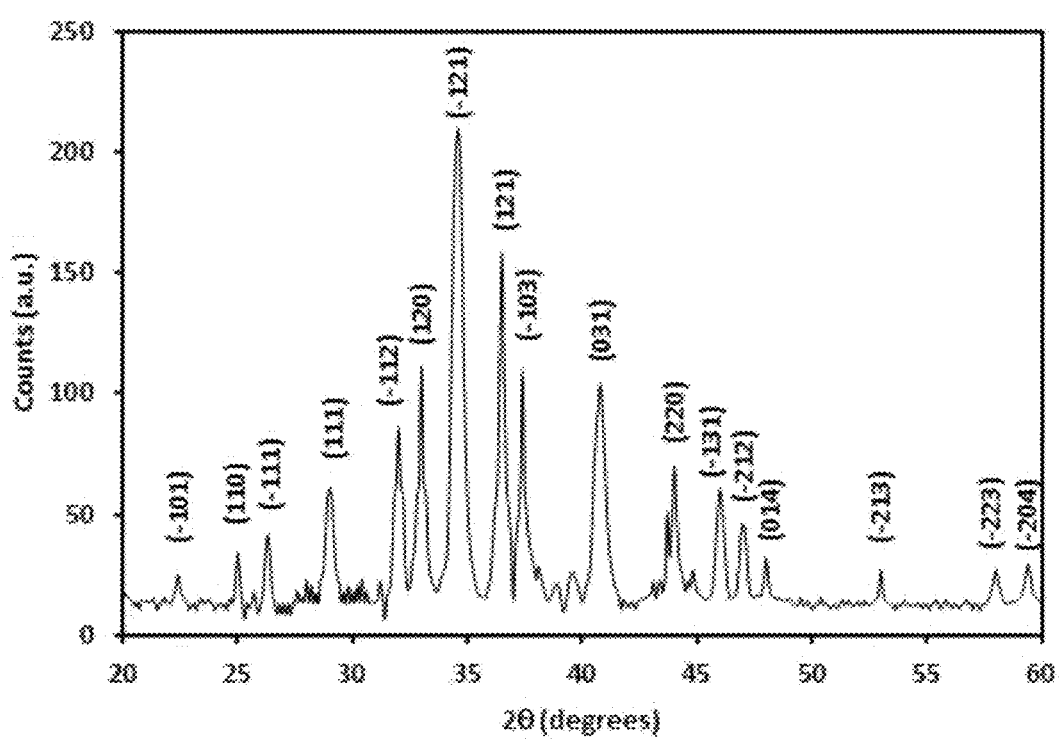
FIG. 2 represents an XRD graph of the star-shaped nanoparticles.

In a three-neck flask, 27.3 mg of silver cyclohexanebutyrate and 0.53 mg of cesium oxalate was dissolved in 50 ml of 1,2-Dihydroxyethane. The solution was heated to 120° C. for 30 minutes in the presence of argon gas. Then, 10 mL of chloromethyl trifluoromethyl sulfide (0.5 M) was quickly injected. After injection, the temperature of the whole mixture was raised to 190° C. and kept refluxing for 40 min. After the reaction, the solution was left to cool down naturally and centrifuged at 15000 rpm for 15 min. The supernatant was collected and washed by toluene and isopropanol to remove the residue of 1,2-Dihydroxyethane. The supernatant was centrifuged again at 5000 rpm for 5 min. The product was discarded and dried at 50° C. for 6 h. FIG. 1C is a SEM image of the final product. The nanoparticles formed during the process found to be starfish like bundle shape with four arms. The length of each arm was measured to be around 100-150 nm and the diameter at the cross point was found to be around 51 nm and at the terminals around 10-16 nm. FIG. 2 shows the XRD of the prepared $Cs_{0.03}Ag_{1.97}S$ with starfish like shape. All peaks matched well with the monoclinic phase of $Ag_2S$ (JCPDS-Card no. 14-0072). There are no other peaks for Ag bi-products or cesium or sulfur compounds in the XRD patterns, indicating that the cesium atoms are located inside the silver sulfide crystals.

Example 2—Decoration of $Cs_{0.03}Ag_{1.97}S$ by 3-(4-hydroxyanilinomethyl)benzothiazoline-2-thione About 112 mg of the 3-(4-hydroxyanilinomethyl)benzothiazoline-2-thione hydrochloride is dissolved in 10 ml of deionized water until clear and homogenous solution was formed at 50° C. The as-prepared $Cs_{0.03}Ag_{1.97}S$ starfish like shape (100 mg) was dispersed into the 3-(4-hydroxyanilinomethyl)benzothiazoline-2-thione hydrochloride solution and refluxed at 50° C. for 35 min. The product was collected through centrifuging at 14000 rpm for 5 min and left to dry under argon flow. FIG. 3 depicts the FTIR spectra of the $Cs_{0.03}Ag_{1.97}S$ starfish like shape before and after decoration with 3-(4-hydroxyanilinomethyl)benzothiazoline-2-thione. The $Cs_{0.03}Ag_{1.97}S$ before decoration showed two bands at 581 $cm^{-1}$ and 484 $cm^{-1}$ which corresponded to Ag—S and Ag—S—Cs bending. The IR spectra for the after decoration with 3-(4-hydroxyanilinomethyl)benzothiazoline-2-thione showed absorption bands at 3426 $cm^{-1}$, 2948 $cm^{-1}$, 2913 $cm^{-1}$, 2534 $cm^{-1}$, 1625 $cm^{-1}$, 1402 $cm^{-1}$, 1179 $cm^{-1}$, 1025 $cm^{-1}$, and 770 $cm^{-1}$ corresponding to O—H and N—H stretching, C—H symmetric stretching, C—H asymmetric stretching, S—C stretching, C—C stretching, H—C—H stretching, C—O bending, C—S—S bending, and C—S—Ag bending vibrations, respectively. The results of the IR spectroscopy implied that the 3-(4-hydroxyanilinomethyl)benzothiazoline-2-thione is bound to the $Cs_{0.03}Ag_{1.97}S$, as shown in FIG. 1B.

Example 3—Photostability of the Decorated $Cs_{0.03}Ag_{1.97}S$ Against pH

A water soluble solution of the decorated $Cs_{0.03}Ag_{1.97}S$ was prepared by dispersing 0.1 g of the decorated $Cs_{0.03}Ag_{1.97}S$ starfish like shape in 50 ml of deionized water and sonicated for 10 min at room temperature. The pH value was determined by a pH meter and it was around 7. Various solutions with different pH values were prepared by adding HCl and NaOH. Solutions with pH values from 1 to 6 were prepared by adding HCl (2M) to the water soluble solution. Also, solutions with pH values ranging from 8 to 10 were prepared by adding NaOH (2M) to the water soluble solution that included the decorated $Cs_{0.03}Ag_{1.97}S$ starfish like shape. The fluorescence intensity was measured by Perkin Elmer LS 55 Fluorescence Spectrometer. The width of the slit was adjusted at 2 nm at excitation wavelength of 470 nm. FIG. 4A showed the influence of the pH value on the luminescence intensity of the decorated $Cs_{0.03}Ag_{1.97}S$ starfish like shape with the 3-(4-hydroxyanilinomethyl)benzothiazoline-2-thione. One may notice that the luminescence intensity was around 41200±80 along the pH values from 1 to 12, implying that the developed decorated starfish compound has high photostability in the acidic and alkaline media, over a pH range of 1 to 12.

Example 4—Photostability of the Decorated $Cs_{0.03}Ag_{1.97}S$ Against Storage Time A water soluble solution of the decorated $Cs_{0.03}Ag_{1.97}S$ was prepared by dispersing 0.1 g of the decorated $Cs_{0.03}Ag_{1.97}S$ starfish like shape in 50 ml of deionized water and sonicated for 10 min at room temperature. This solution is stored in refrigerator at 10° C. for 12 months. The luminescence spectra of this solution were measured along this period at a time interval of one month. The solution is prepared via the same procedure described previously in example 3. FIG. 4B shows the influence of the storage time the luminescence intensity of the decorated $Cs_{0.03}Ag_{1.97}S$ starfish like shape with the 3-(4-hydroxyanilinomethyl)benzothiazoline-2-thione. One may notice that the luminescence intensity was around 41200±30 along the time from 1 to 12 months, implying that the developed decorated starfish compound has high photostability against storage time.

Example 5—Photostability of the Decorated $Cs_{0.03}Ag_{1.97}S$ Against Temperature A water soluble solution of the decorated $Cs_{0.03}Ag_{1.97}S$ was prepared by dispersing 0.1 g of the decorated $Cs_{0.03}Ag_{1.97}S$ starfish like shape in 50 ml of deionized water and sonicated for 10 min at room temperature. The temperature of this solution is raised to 60° C. The luminescence intensity of the solution was measured for different solution with temperatures ranging from 10° C. to 60° C. The solution is prepared via the same procedure described previously in example 3. FIG. 4C shows the influence of the temperature on the luminescence intensity of the decorated $Cs_{0.03}Ag_{1.97}S$ starfish like shape with the 3-(4-hydroxyanilinomethyl)benzothiazoline-2-thione. One may notice that the luminescence intensity was around 41190±50 along the temperature range from 10° C. to 60° C., implying that the decorated starfish compound has high photostability against temperature.

Example 6—Preparation of Arsenic (III) Solution in Water 137 mg of $NaASO_2$ was dissolved in 1000 ml of deionized water to obtain an arsenic solution of 100 ppm. This standard arsenic solution was further diluted to get solutions of different concentrations of arsenic reached to (0.01 ppb, 0.1 ppb, 1 ppb, 10 ppb, 100 ppb, 1 ppm 10 ppm, and 100 ppm).

Example 7—Preparation of Arsenic (III) Solution in Blood Serum

The whole blood was withdrawn from the vein of the arm by using syringe and collected in anticoagulant-treated tubes such as EDTA-treated (lavender tops) or citrate-treated (light blue tops). The blood cells are removed from plasma by centrifugation for 15 minutes at 2000×g by refrigerated centrifuge. The resulted plasma was mixed with various concentrations of $NaASO_2$ to produce blood containing 0.01 ppb, 0.1 ppb, 1 ppb, 10 ppb, 100 ppb, 1 ppm, 10 ppm and 100 ppm of arsenic ions.

Example 8—Detection of Arsenic (III) in Water and Blood Serum

To each 10 ml of the contaminated water and blood serum with arsenic with concentrations of 0.01 ppb, 0.1 ppb, 1 ppb, 10 ppb, 100 ppb, 1 ppm, 10 ppm and 100 ppm, 0.1 g of the decorated $Cs_{0.03}Ag_{1.97}S$ starfish like shape are added and sonicated for 10 min at room temperature. The fluorescence intensity was measured by Perkin Elmer LS 55 Fluorescence Spectrometer. The width of the slit was adjusted at 2 nm at excitation wavelength of 470 nm. FIGS. 4D and 4E represent the FL intensity of the decorated $Cs_{0.03}Ag_{1.97}S$ starfish like shape with the 3-(4-hydroxyanilinomethyl)benzothiazoline-2-thione at various concentrations of arsenic ions in water and blood serum, respectively. It is clearly seen that the FL intensity of the decorated $Cs_{0.03}Ag_{1.97}S$ starfish like shape with the 3-(4-hydroxyanilinomethyl)benzothiazoline-2-thione is decreased as the concentration of As(III) ions increased. FIGS. 5A, 5B, 5C, and 5D show the variation of the fluorescence intensity of the decorated $Cs_{0.03}Ag_{1.97}S$ starfish like shape with the 3-(4-hydroxyanilinomethyl)benzothiazoline-2-thione as a function of the As(III) concentration in water and blood serum. The FL intensity is linearly changed with the As(III) ions concentration along the range 0.01 ppb to 100 ppm with linear correlation factor of $R^2=0.998$. The linear relationship was fitted by the Stern-Volmer relation, which defined as $$I_o/I = 1 + K_{SV}C \quad (1)$$

where $I_0$ and $I_{As}$ are the FL intensity of the decorated $Cs_{0.03}Ag_{1.97}S$ starfish like shape with the 3-(4-hydroxyanilinomethyl)benzothiazoline-2-thione in the absence and presence of arsenic ions, respectively. K is Stern-Volmer constant and C is the arsenic ions concentration. The Stem-Volmer relation fitted well the experimental data and the $K_{SV}$ was found to be about 0.003. The detection limit (3σ) was determined accordingly to be about 0.001 ppb.

Example 9—Detection of Arsenic (III) in the Presence of Foreign Ions

Figure 6:
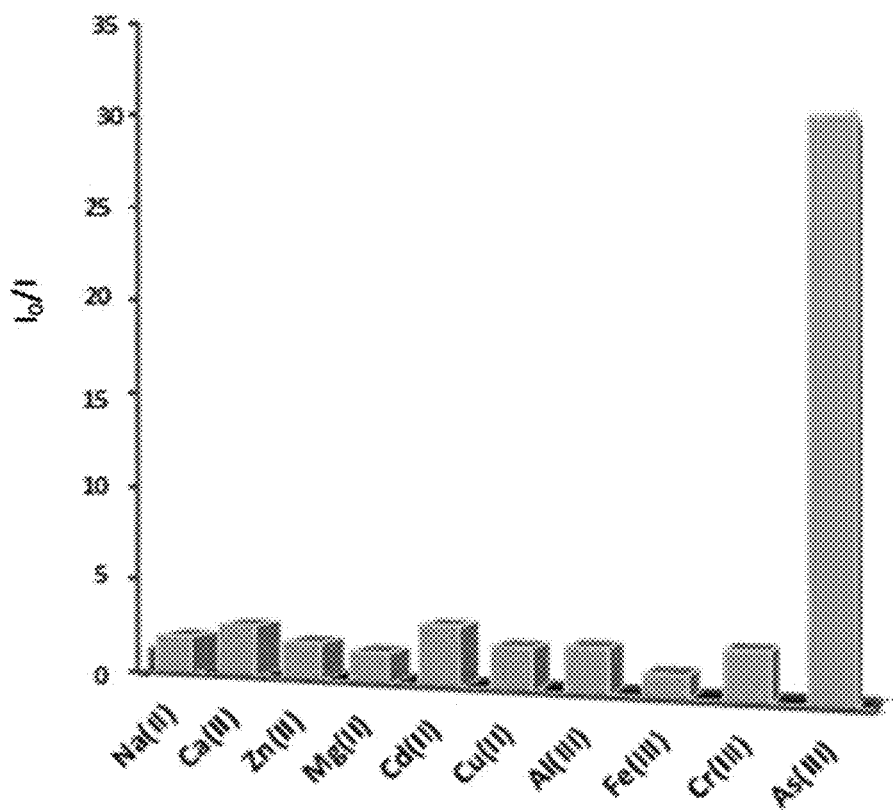
FIG. 6 represents the relative fluorescence intensity of a suspension having an arsenic concentration of 100 ppm that includes the nanoparticle 110 and other metal cations.

Since the practical application of the fluorescence probe mainly depends on its high selectivity with respect to the target ions, the influence of the presence of foreign ions on arsenic detection via the decorated $Cs_{0.03}Ag_{1.97}S$ starfish like shape with the 3-(4-hydroxyanilinomethyl)benzothiazoline-2-thione has been investigated. FIG. 6 depicts the effect of some selected foreign ions on the FL intensity of the decorated $Cs_{0.03}Ag_{1.97}S$ starfish like shape. One may observe that the $Na^{1+}$, $Ca^{2+}$, $Mg^{2+}$, $Cd^{2+}$, $Zn^{2+}$, $Cu^{2+}$, $Al^{3+}$, $Fe^{3+}$ and $Cr^{3+}$ ions showed negligible influence on the FL intensity compared to the $As^{3+}$ ions at a same solution with an arsenic concentration of about 100 ppm. However, the standard deviation of 20 measurements of the FL intensity in the presence of 1 ppm of arsenic and 100 ppm of the foreign ions was about 1.02%. The introduction of the foreign ions with different ratios (1:100, 1:1000, 1:10000 and 1:100000) showed interference of less than 1.02%.

Example 10—Adsorption of Arsenic (III) on the Surface of the Decorated $Cs_{0.03}Ag_{1.97}S$ Starfish Like Shape with the 3-(4-hydroxyanilinomethyl)benzothiazoline-2-thione To determine the amount of arsenic adsorbed by the decorated $Cs_{0.03}Ag_{1.97}S$ starfish like shape with the 3-(4-hydroxyanilinomethyl)benzothiazoline-2-thione, inductive coupled plasma mass spectroscopy was performed on arsenic-contaminated water and blood serum samples before and after the adsorption process. Various contaminated samples were first prepared in tap water (contains 100 ppm of As), wheel water (contains 30 ppm of As), river water (contains 10 ppm of As), waste water (contains 5 ppm of As) and blood serum (contains 1 ppm of As). To each 10 ml of solution, 0.1 g of the decorated $Cs_{0.03}Ag_{1.97}S$ starfish like shape with the 3-(4-hydroxyanilinomethyl)benzothiazoline-2-thione was added and sonicated for 10 min. Then the decorated $Cs_{0.03}Ag_{1.97}S$ starfish like shape powder was collected by centrifuging at 15000 rpm and left to dry naturally at ambient conditions. The ICP-AES analysis for the collected $Cs_{0.03}Ag_{1.97}S$ starfish like shape powder and the solutions after adsorption process were performed and the results presented in Table 1. The results show that the arsenic is adsorbed by the decorated $Cs_{0.03}Ag_{1.97}S$ starfish like shape. This analysis support the interaction of arsenic with the decorated $Cs_{0.03}Ag_{1.97}S$ starfish like shape with the 3-(4-hydroxyanilinomethyl)benzothiazoline-2-thione. The results further indicate that arsenic could effectively be removed from a contaminated sample using the decorated $Cs_{0.03}Ag_{1.97}S$ starfish like shape with the 3-(4-hydroxyanilinomethyl)benzothiazoline-2-thione.

Example 11—Advantages of the Decorated $Cs_{0.03}Ag_{1.97}S$ Starfish Like Shape with the 3-(4-hydroxyanilinomethyl)benzothiazoline-2-thione The proposed nanoparticles and the arsenic detection method provided here offer an ultrasensitive arsenic detection technique, which is applicable for low concentrated arsenic-containing solutions up to 0.001 ppb. The technique does not require advanced analytical instruments and skilled technicians. Furthermore, the technique was found to effectively and efficiently remove arsenic from contaminated source such as water or a blood sample, without leaving behind any traces of arsenic.

The invention claimed is:

1. A star-shaped nanoparticle, comprising:
   silver sulfide; and
   cesium,
   wherein the star-shaped nanoparticle has a chemical formula of $Cs_xAg_yS_z$, wherein $0.01 \leq x \leq 0.1$, $1.5 \leq y \leq 2.5$, and $z=1$.

2. The star-shaped nanoparticle of claim 1, which has a chemical formula of $Cs_xAg_yS_z$, wherein $0.02 \leq x \leq 0.04$, $1.9 \leq y \leq 2.0$, and $z=1$.

3. The star-shaped nanoparticle of claim 1, which has a chemical formula of $Cs_{0.03}Ag_{1.97}S$.

4. The star-shaped nanoparticle of claim 1, which has a monoclinic crystal structure.

5. The star-shaped nanoparticle of claim 1, which comprises four conical arms each with a longitudinal axis that is substantially perpendicular to that of an adjacent arm, wherein each arm has a cone height of about 100 to 150 nm, a cone base diameter of about 40 to 60 nm, and a cone tip diameter of about 5 to 20 nm.

6. The star-shaped nanoparticle of claim 1, further comprising:
   a sulfur heterocycle ligand, which is bound to the star-shaped nanoparticle via a sulfur atom.

7. The star-shaped nanoparticle of claim 6, wherein the sulfur heterocycle ligand has a structure of formula (I), a structure of formula (II), or a structure of formula (III):

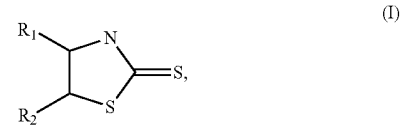

(I)

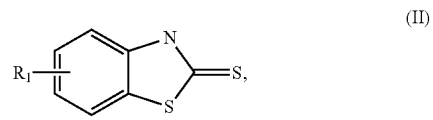

(II)

TABLE 1

Adsorption of arsenic onto the decorated $Cs_{0.03}Ag_{1.97}S$ nanoparticles

| Sample | Amount of As in the sample (ppm) | Amount of As adsorbed on the surface of decorated $Cs_{0.03}Ag_{1.97}S$ starfish like shape (ppm) | Amount of As in the sample after adsorption process (ppm) | Rate of removal (%) |
|---|---|---|---|---|
| Tap water | 100 | 99.9973 | Below detection limit | 99.999 |
| Wheel water | 30 | 29.9981 | Below detection limit | 99.999 |
| River water | 10 | 9.9999 | Below detection limit | 99.999 |
| Waste water | 5 | 4.9998 | Below detection limit | 99.999 |
| Blood serum | 1 | 0.9999 | Below detection limit | 99.999 |

-continued

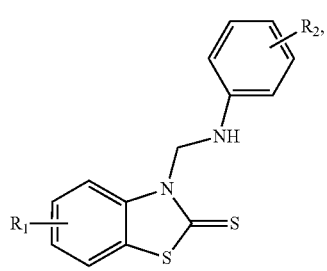

(III)

wherein $R_1$ and $R_2$ are independently a hydrogen, a hydroxyl, a halogen atom, a cyano, a nitro, an optionally substituted alkyl, an optionally substituted cycloalkyl, an optionally substituted cycloalkylalkyl, an optionally substituted arylalkyl, an optionally substituted heteroaryl, an optionally substituted aryl, or an optionally substituted heterocyclyl.

8. The star-shaped nanoparticle of claim 6, wherein the sulfur heterocycle ligand has a structure of formula (IV), a structure of formula (V), or a structure of formula (VI):

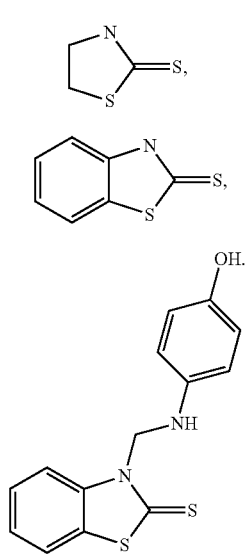

(IV)

(V)

(VI)

9. A method of producing a star-shaped nanoparticle, comprising:
mixing a silver-containing compound with a cesium-containing compound and a dihydroxy alkane to form a first solution;
heating the first solution to a temperature of 100 to 150° C. in an inert atmosphere;
mixing a sulfide compound with the first solution to form a second solution;
heating the second solution at a temperature of 150 to 220° C.; and
centrifuging the second solution at a rotational speed of 10,000 to 15,000 rpm to form the star-shaped nanoparticle, which has a chemical formula of $Cs_xAg_yS_z$, wherein $0.01 \leq x \leq 0.1$, $1.5 \leq y \leq 2.5$, and $z=1$.

10. The method of claim 9,
wherein the silver-containing compound comprises at least one selected from the group consisting of silver cyclohexanebutyrate, silver heptafluorobutyrate, silver lactate, silver pentafluoropropionate, silver tetrafluoroborate, and silver p-toluenesulfonate,
wherein the cesium-containing compound is cesium oxalate,
wherein the sulfide compound is chloromethyl trifluoromethyl sulfide, and
wherein the dihydroxy alkane is ethylene glycol.

11. The method of claim 9, further comprising:
treating the star-shaped nanoparticle with an aqueous solution comprising a sulfur heterocycle ligand to form a star-shaped nanoparticle sulfur heterocycle complex, wherein the sulfur heterocycle ligand is bound to the star-shaped nanoparticle via a sulfur atom.

12. The method of claim 11, wherein the sulfur heterocycle ligand has a structure of formula (I), a structure of formula (II), or a structure of formula (III):

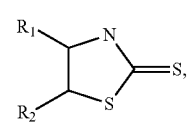

(I)

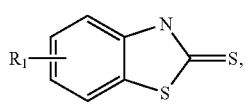

(II)

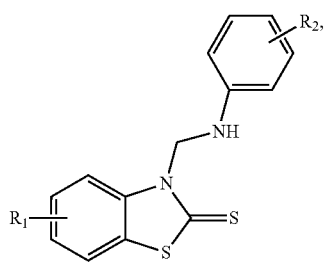

(III)

wherein $R_1$ and $R_2$ are independently a hydrogen, a hydroxyl, a halogen atom, a cyano, a nitro, an optionally substituted alkyl, an optionally substituted cycloalkyl, an optionally substituted cycloalkylalkyl, an optionally substituted arylalkyl, an optionally substituted heteroaryl, an optionally substituted aryl, or an optionally substituted heterocyclyl.

13. The method of claim 11, wherein the sulfur heterocycle ligand has a structure of formula (IV), a structure of formula (V), or a structure of formula (VI):

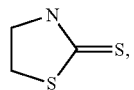

(IV)

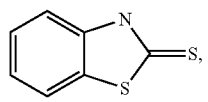

(V)

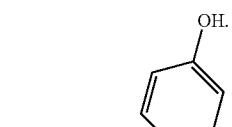

(VI)

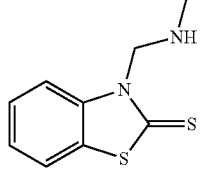

14. A method of determining an arsenic concentration in an arsenic-containing solution, comprising:
   mixing a star-shaped nanoparticle with the arsenic-containing solution and sonicating to form a suspension;
   measuring a fluorescence intensity of the suspension; and
   determining the arsenic concentration of the arsenic-containing solution based on the fluorescence intensity,
   wherein the star-shaped nanoparticle comprises
      silver sulfide and cesium of formula $Cs_xAg_yS_z$, wherein $0.01 \leq x \leq 0.1$, $1.5 \leq y \leq 2.5$, and $z=1$, and
      a sulfur heterocycle ligand of formula (VI) bound to the star-shaped nanoparticle via a sulfur atom:

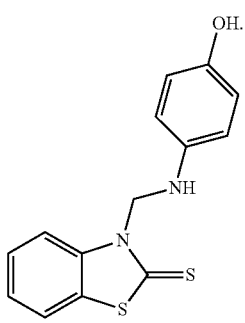

(VI)

15. The method of claim 14, wherein the arsenic-containing solution has an arsenic concentration in the range of 0.001 ppb to 100 ppm.

16. The method of claim 14, wherein the arsenic-containing solution has a temperature in the range of 10 to 60° C.

17. The method of claim 14, wherein the arsenic-containing solution comprises $As^{3+}$ and at least one cation selected from the group consisting of $Na^+$, $Ca^{2+}$, $Mg^{2+}$, $Cd^{2+}$, $Zn^{2+}$, $Cu^{2+}$, $Al^{3+}$, $Fe^{3+}$, and $Cr^{3+}$, and wherein the method has an arsenic selectivity of at least 60%.

18. A method of removing arsenic from an arsenic-containing solution, comprising:
   mixing the star-shaped nanoparticle of claim 8 with the arsenic-containing solution and sonicating to form a suspension; and
   centrifuging the suspension and removing the star-shaped nanoparticle from the suspension to form a supernatant,
   wherein no more than 1% of arsenic in the arsenic-containing solution is present in the supernatant.

19. The method of claim 18, wherein the arsenic-containing solution is one selected from the group consisting of tap water, seawater, wastewater, blood, and blood serum.

20. The method of claim 18, wherein a pH of the supernatant is substantially similar to a pH of the arsenic-containing solution.

* * * * *